United States Patent [19]

Francis

[11] Patent Number: 4,471,532

[45] Date of Patent: Sep. 18, 1984

[54] DIRECT READING GRADE ROD WITH A SLIDING SCALE

[76] Inventor: John G. R. Francis, P.O. Box 329, Manning, S.C. 29102

[21] Appl. No.: 497,996

[22] Filed: May 25, 1983

[51] Int. Cl.³ .............................................. G01C 15/00
[52] U.S. Cl. ...................................... 33/296; 33/294; 33/161
[58] Field of Search .................. 33/293, 294, 296, 161

[56] References Cited

U.S. PATENT DOCUMENTS

| | | | |
|---|---|---|---|
| 287,021 | 10/1883 | Gurley | 33/296 |
| 360,836 | 4/1887 | Wright | 33/296 |
| 637,501 | 11/1899 | Classon | 33/296 |
| 716,006 | 12/1902 | Doak | 33/296 |
| 828,166 | 8/1906 | Wiswall | 33/294 |
| 905,441 | 12/1908 | Lenker | 33/296 |
| 1,220,358 | 3/1917 | Martin | 33/296 |
| 2,017,346 | 10/1935 | Linn | 33/294 |
| 3,492,729 | 2/1970 | Crain | 33/296 |
| 4,060,909 | 12/1977 | Collins et al. | 33/296 |

Primary Examiner—Willis Little
Attorney, Agent, or Firm—Sughrue, Mion, Zinn, Macpeak and Seas

[57] ABSTRACT

A direct reading grade rod as provided with a fixed scale having display windows therein and one or more sliding members slidable behind the fixed member and carrying a plurality of number sets, with different positions of the sliding member resulting in different sequences of numbers displayed in the windows.

29 Claims, 49 Drawing Figures

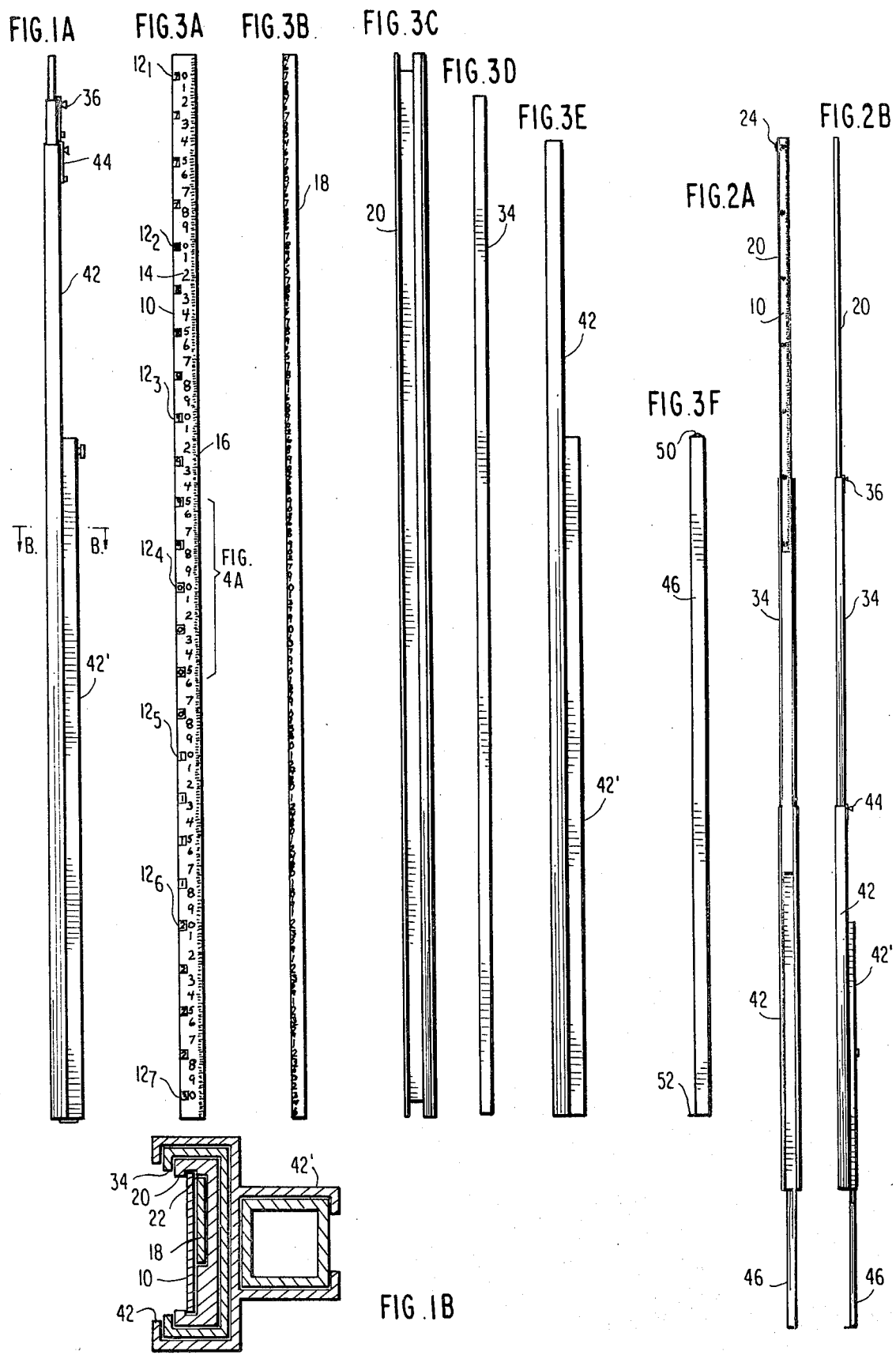

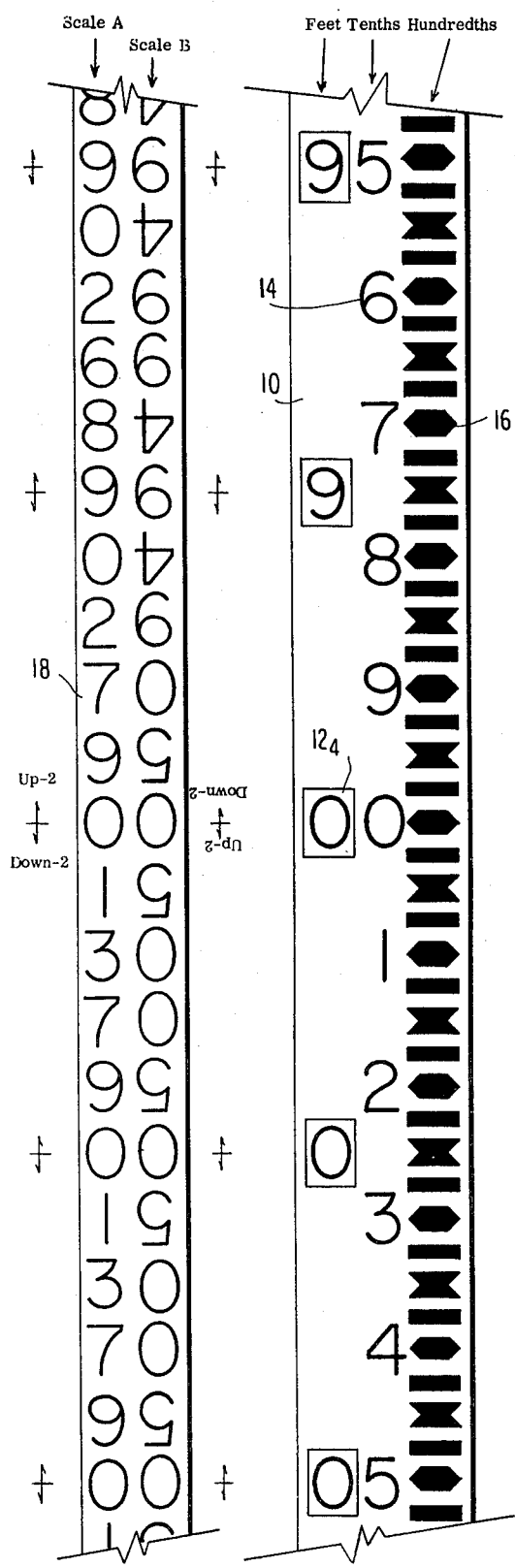
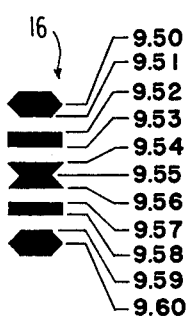
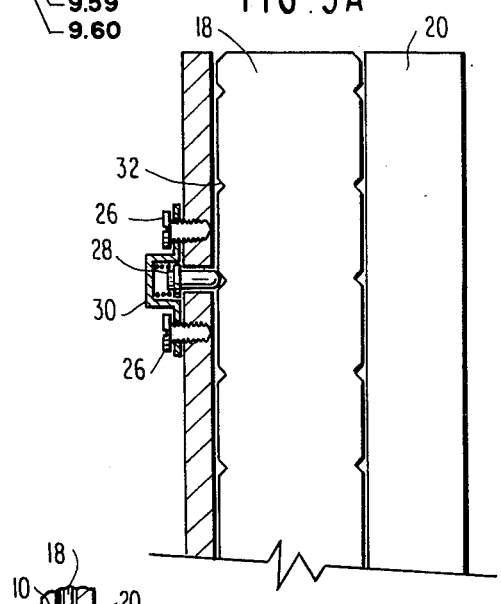
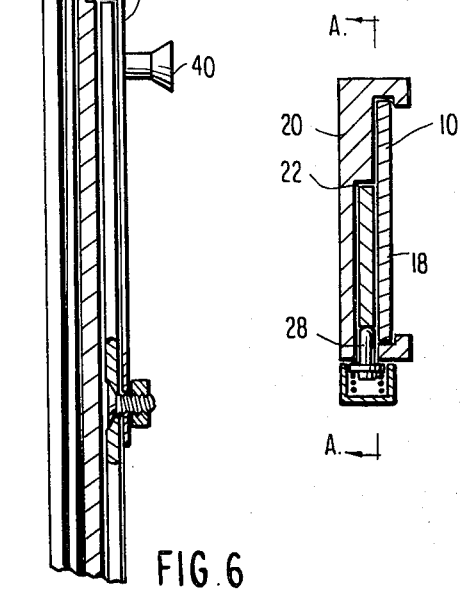

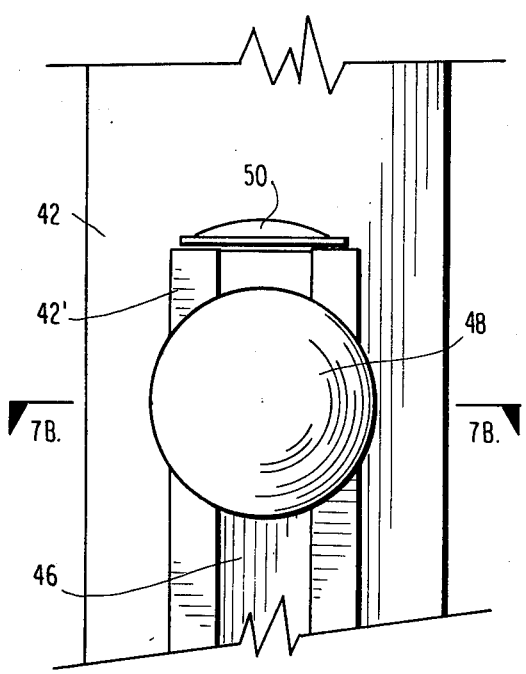
FIG. 7A
FIG. 7B
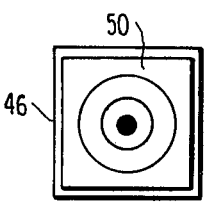
FIG. 8
FIG. 9
| Scale A | Scale B | Scale C | Scale D |
|---|---|---|---|
| 4 | 7 | 5 | 9 |
| 6 | 2 | 0 | 4 |
| 7 | 7 | 5 | 9 |
| 8 | 2 | 0 | 4 |
| 0 | 7 | 5 | 9 |
| 5 | 8 | 6 | 0 |
| 7 | 3 | 1 | 5 |
| 8 | 8 | 6 | 0 |
| 9 | 3 | 1 | 5 |
| 1 | 8 | 6 | 0 |
| 6 | 9 | 7 | 1 |
| 8 | 4 | 2 | 6 |
| 9 | 9 | 7 | 1 |
| 0 | 4 | 2 | 6 |
| 2 | 9 | 7 | 1 |
| 7 | 0 | 8 | 2 |
| 9 | 5 | 3 | 7 |
| 0 | 0 | 8 | 2 |
| 1 | 5 | 3 | 7 |
| 3 | 0 | 8 | 2 |
| 8 | 1 | 9 | 3 |
| 0 | 6 | 4 | 8 |
| 1 | 1 | 9 | 3 |
| 2 | 6 | 4 | 8 |
| 4 | 1 | 9 | 3 |
| 9 | 2 | 0 | 4 |
| 1 | 7 | 5 | 9 |
| 2 | 2 | 0 | 4 |
| 3 | 7 | 5 | 9 |
| 5 | 2 | 0 | 4 |
| 0 | 3 | 1 | 5 |
| 2 | 8 | 6 | 0 |
| 3 | 3 | 1 | 5 |
| 4 | 8 | 6 | 0 |
| 6 | 3 | 1 | 5 |

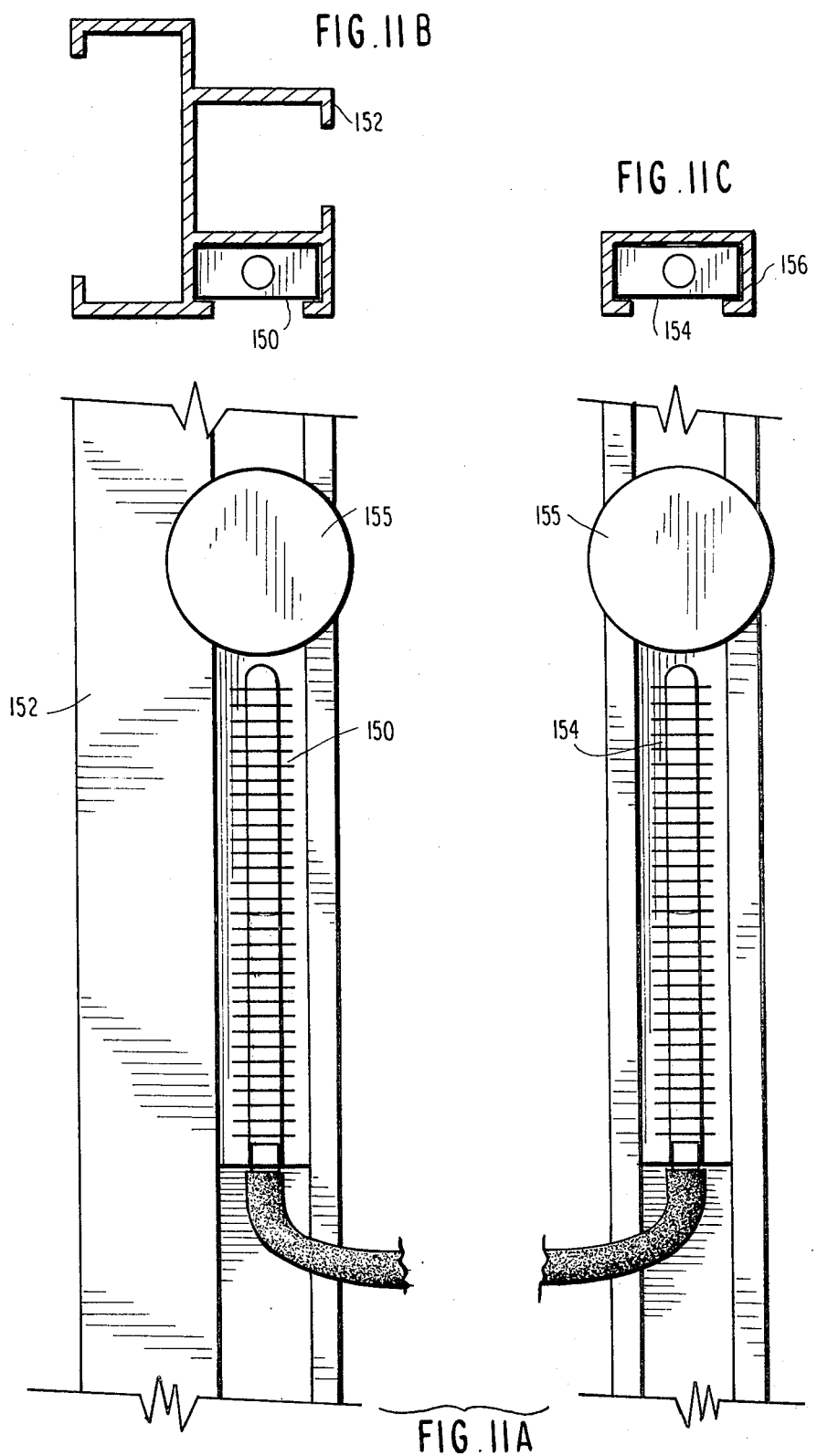

FIG.12A
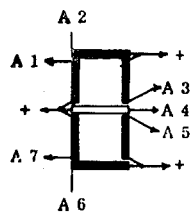
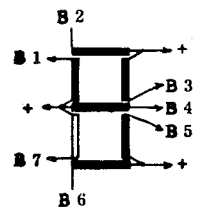
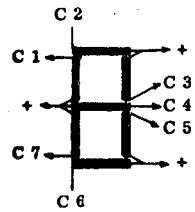
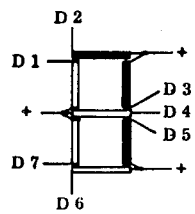
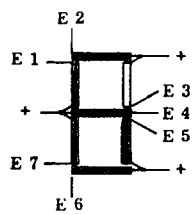
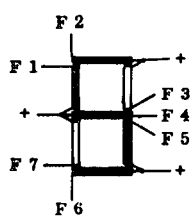
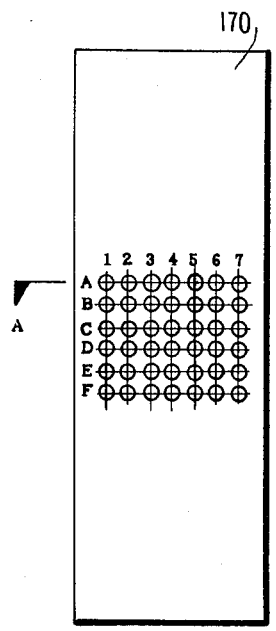
FIG.12B
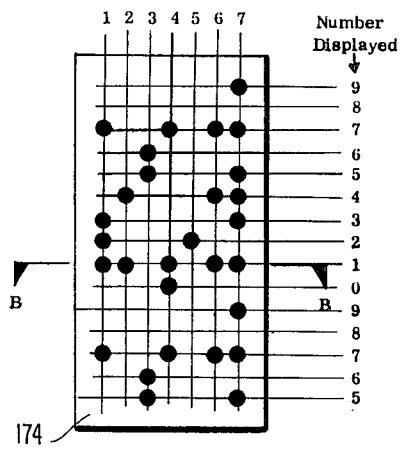
FIG.12D
FIG.12C
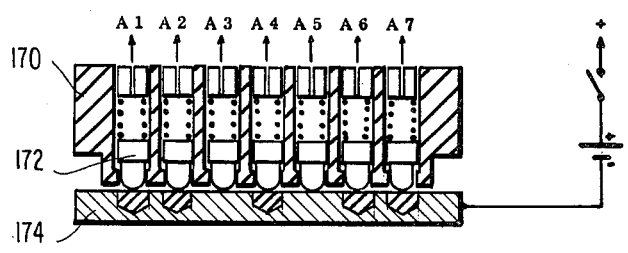

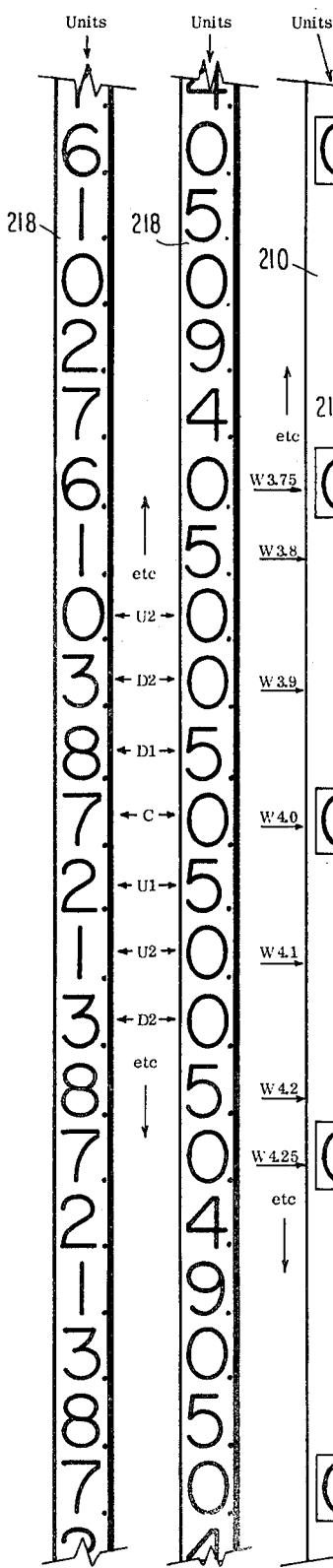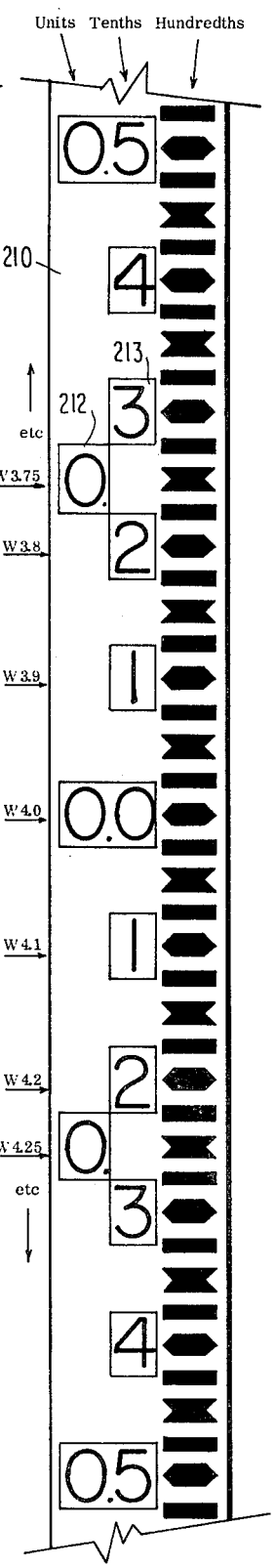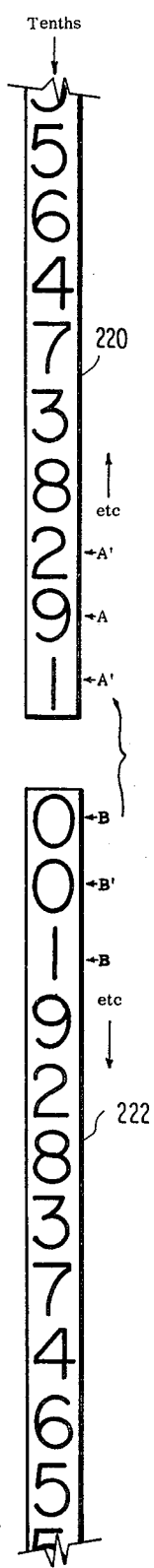

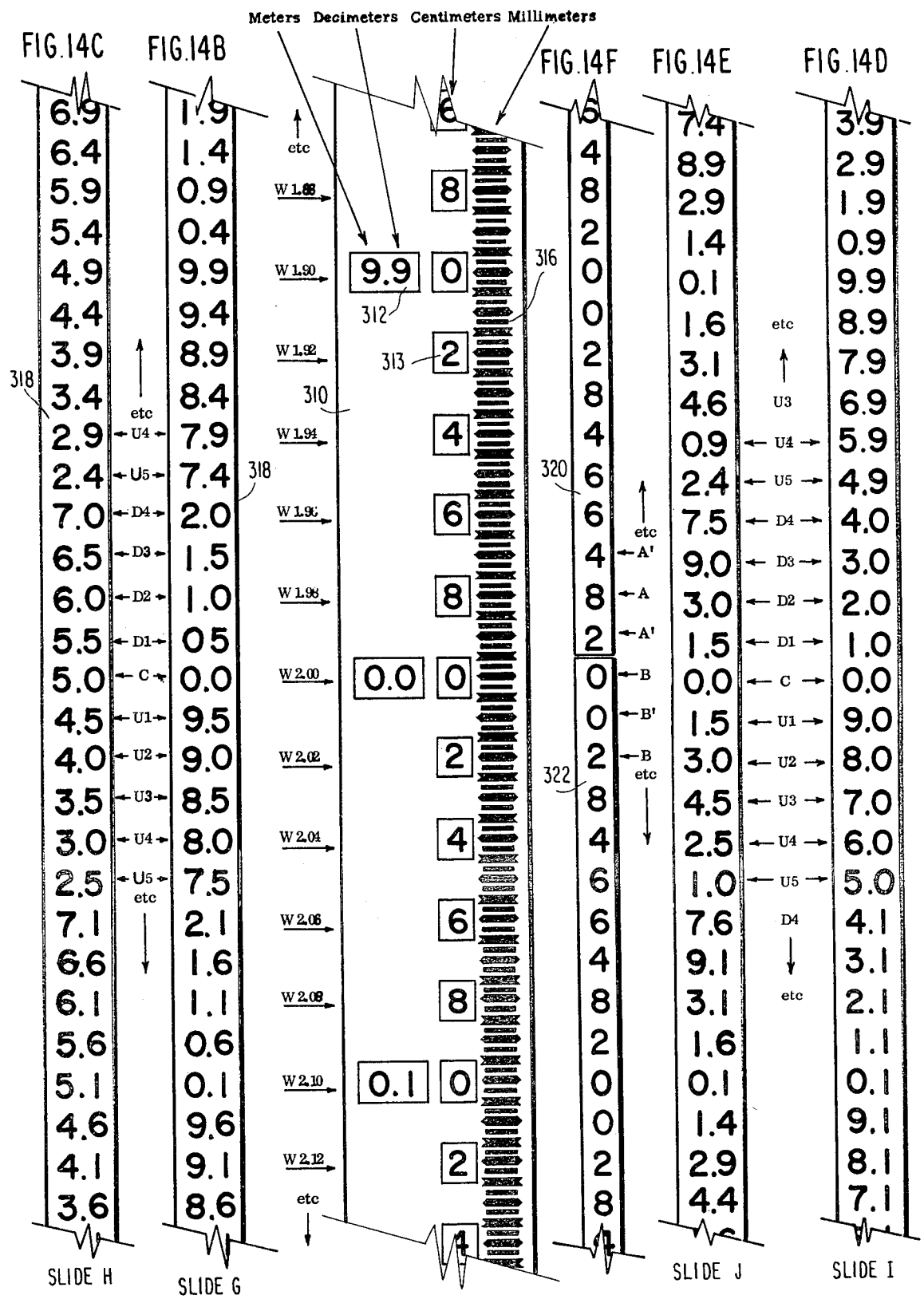

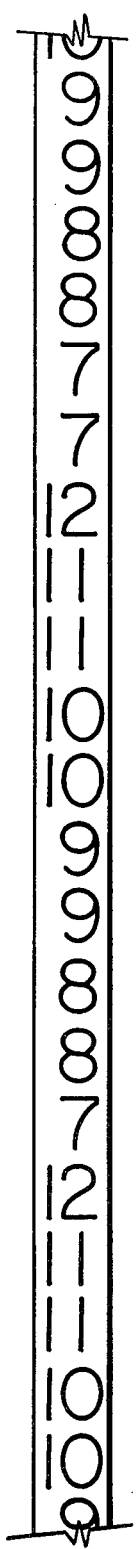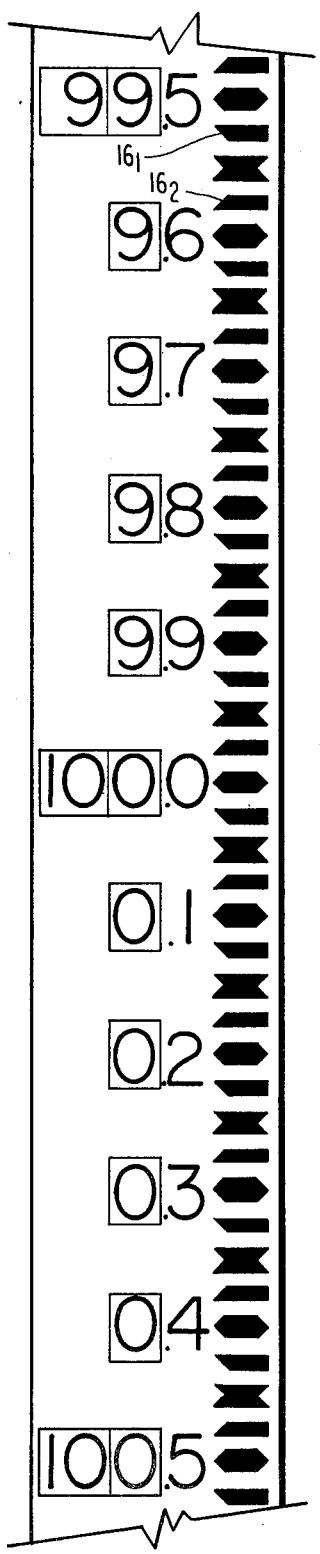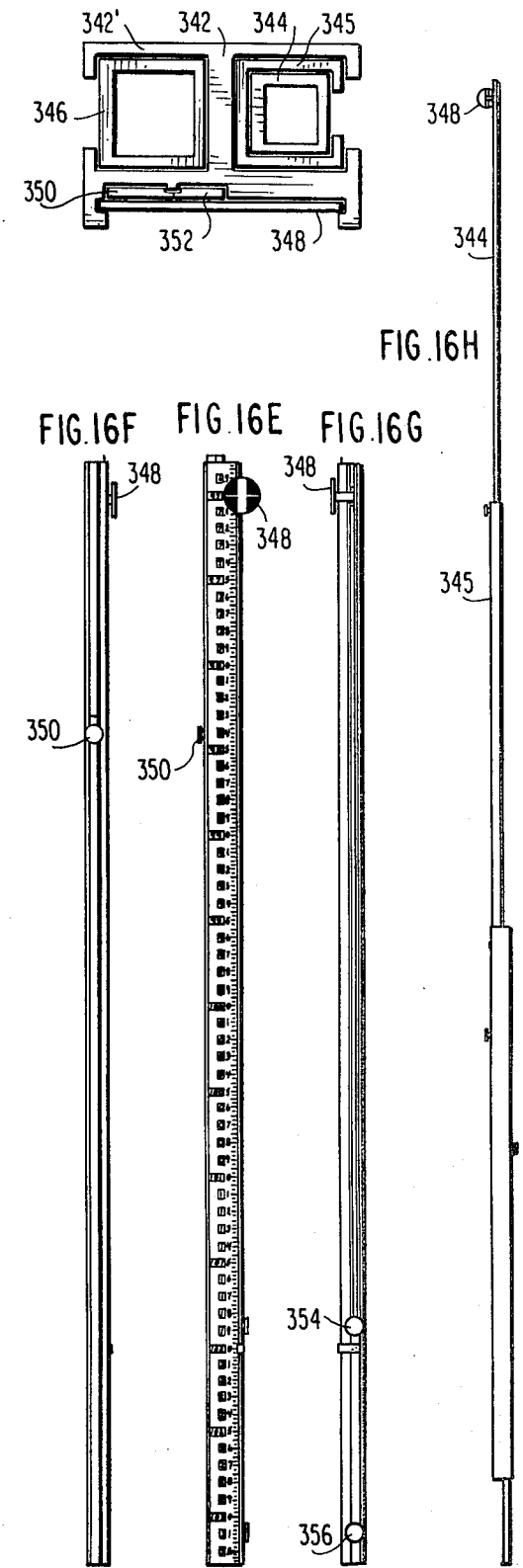

DIRECT READING GRADE ROD WITH A SLIDING SCALE

BACKGROUND OF THE INVENTION

This invention is directed to grade measurement devices, commonly referred to as surveying or levelling rods, and is more particularly directed to such a rod which is not only easier to use and to read but which is also characterized by improved versatility while maintaining a relatively simple rod construction. Surveying or levelling rods, hereinafter referred to as "grade" rods, have been widely used in one form or another for hundreds of years. A typical use of such a rod would involve the setting of a rod on a reference point and equating the reading taken to the known elevation of the reference point. When the rod is moved to other locations, a change in elevation would result in a different position of the rod being sighted by the telescope, and in this way the elevations of these other locations can be determined relative to the initial reference elevation.

One problem with such grade rods has been the limited range of elevations which can be measured with any particular rod without recalibrating to a new reference elevation. For example, if a rod is six feet in length and the telescope is set such that it will read from the center of the rod when the rod is at the reference elevation, the rod can only indicate grade variations of ±3 feet from the reference elevation. In an application involving a wide range of grade variations, a very long grade rod would be necessary, but this would be unwieldy. Alternatively, repeated instrument setups and recalibrations are necessary.

Some attempts have been made to provide extendable rods, and one technique is to provide extendable calibrated rod sections. However, this results in a somewhat expensive rod in that each extension will require calibrated gradation markings. Some of the previous attempts at providing extendable rods have also provided changeable number sequences. However, the number sequence changing mechanisms have been such that it has been impractical to display numbers at intervals of less than once per foot of rod length. This makes such a rod difficult to use, since the field of view of the sighting telescope may be substantially smaller than one foot. These sequence changing mechanisms have also been impractical for implementing a rod with an effective length of much greater than six feet.

A further disadvantage of most rods is that the number sequences typically increase from bottom-to-top and therefore do not provide a direct reading of the elevation or the elevation change. Since the user must perform mathematical calculations in order to determine the grade variation, there is an increased opportunity for human error.

Still further, even if the number sequence is provided such that it will increase from top-to-bottom of the rod, any given rod includes a number sequence which increases or decreases in only one direction. There are a number of different grade rod applications which will require different types of number sequences, and it has been necessary to use a different rod in each case.

SUMMARY OF THE INVENTION

It is therefore an object of the present invention to provide a grade rod which is easier to use and eliminates the above-described disadvantages while maintaining a relatively simple and inexpensive construction.

It is a further object of the invention to provide such a grade rod which is a direct reading rod to thereby eliminate the error-prone and time-consuming process of field calculations.

It is a further object of this invention to provide such a rod of sufficient effective length to minimize the number of viewing instrument setups and resultant recalibrations.

It is a still further object of this invention to provide a grade rod having variable number sequences for display, to thereby provide continuous calibration and maximize utilization of the entire length of the calibrated portion of the rod.

It is a still further object of this invention to provide such a grade rod having a variable display while also displaying unit numbers at intervals considerably less than once per foot to ensure that the necessary numbers will appear within the narrow field of view of the sighting telescope.

Briefly, these and other objects of the invention are achieved by providing a grade rod having a calibrated portion and a number of non-calibrated extensions of predetermined length. The grade rod includes a fixed scale member having a plurality of display windows, and a sliding member is slidable behind the fixed member and carries different sets of numbers for each of the display windows. By moving the sliding scale member to different positions, the number sequence appearing in the display windows can be varied to maintain calibration of the rod when the extensions are extended or retracted. With such an arrangement, the effective length of the grade rod can be many times the length of its calibrated section.

In a further improvement according to the present invention, the number sequences can be changed so that the rod can be used as a conventional depth rod, a direct reading elevation rod or a direct reading cut-and-fill rod, this further improvement being realized by providing a special variable units scale and also a variable tenths scale. The tenths scale may be a single sliding member or it may comprise two or more sliding scales which can be independently moved in opposite directions. The two sliding members can be moved simultaneously or one at a time.

A number of variations and accessories can be added to the basic rods to further increase their versatility.

BRIEF DESCRIPTION OF THE DRAWINGS

The invention will be more clearly understood from the following description in conjunction with the accompanying drawings, in which:

FIG. 1A is a side view of a direct reading grade rod according to a first embodiment of this invention in its collapsed position, and FIG. 1B is a cross-sectional view along lines B—B of FIG. 1A;

FIGS. 2A and 2B illustrate front and side views, respectively, of the grade rod of FIG. 1A in its fully extended position;

FIGS. 3A-3F illustrate individually the various members which make up the composite rod of FIG. 1A;

FIG. 4A is an enlarged illustration of a portion of the fixed scale 10 of FIG. 3A;

FIG. 4B is an enlarged illustration of one example of a sliding member 18 in FIG. 3B;

FIGS. 5A and 5B are detailed views of the click-stop mechanism 24 of FIG. 2A, with FIG. 5A being a view along lines A—A of FIG. 5B;

FIG. 6 is a side elevational view of the extension clip 36 in FIG. 1A;

FIG. 7A is an enlarged illustration of the adjustment leg clamping mechanism 48, and FIG. 7B is a sectional view along lines 7B—7B of FIG. 7A;

FIG. 8 is a top plan view of the bubble level accessory on the adjustment leg;

FIG. 9 is a condensed illustration of four suitable number arrangements for the sliding member 18;

FIGS. 11A–11C are explanatory diagrams of a grade indicator attachment useful with a grade rod according to the present invention;

FIGS. 12A–12D are explanatory diagrams and illustrations of an electronic digital rod according to the present invention;

FIGS. 13A–13D are exploded illustrations of portions of various scale members for use in a universal grade rod embodiment according to the present invention;

FIGS. 14A–14F are exploded illustrations of various sliding members usable in a metric universal grade rod according to the present invention;

FIGS. 16A–16H show various views of an architectural laser rod embodiment of the present invention.

DETAILED DESCRIPTION OF THE PREFERRED EMBODIMENTS

Figure 10A:
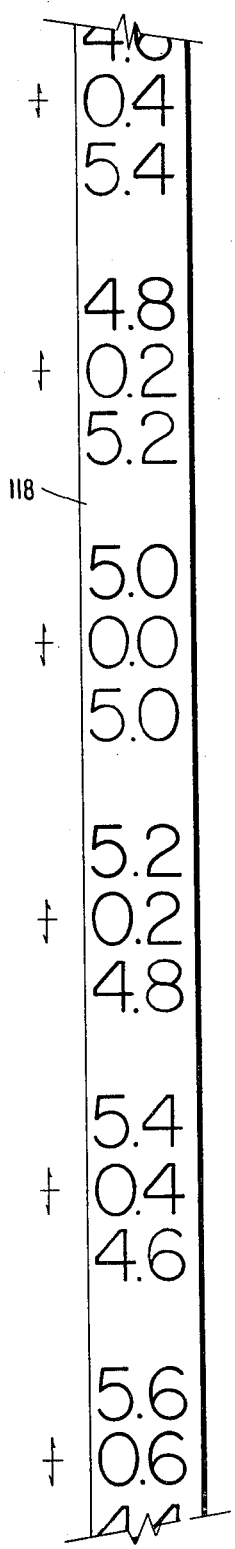
FIG. 10A is an exploded illustration of a portion of a sliding member suitable for cut-and-fill applications.

FIG. 1A illustrates a side view of a direct reading grade rod according to a first embodiment of this invention in its collapsed position, with FIG. 1B providing a top cross-sectional view of the rod. FIGS. 2A and 2B illustrate the rod in its fully extended position, with FIG. 2A providing a front view and FIG. 2B providing a side view from the same angle as FIG. 1A. It should be noted that the scale of the drawing in FIGS. 2A and 2B is about half that of FIG. 1A. FIGS. 3A–3F illustrate individually the various members which make up the composite rod, with FIGS. 3A–3C being front views and FIGS. 3D–3F being side views.

Before describing the invention in detail, it should be noted that the scales on grade measurement devices of this type may be marked off in meters, feet, etc., depending on the intended use. The invention will be described hereunder as a rod marked off in feet, tenths of a foot and hundredths of a foot, but it should be appreciated that the invention is not so limited, but is applicable as well to any other measurement system which may be desired.

The rod according to a first embodiment of this invention includes a fixed scale member 10 which carries a desired sequence of scale markings. In the first embodiment to be described, the fixed scale 10 includes a plurality of windows 12 for displaying feet, a scale of numbers 14 for indicating tenths of feet, and a series of gradation marks 16 for indicating hundredths of feet. The fixed scale 10 of FIG. 3A is shown in more detail in FIG. 4A, where it can be seen that the numbers of the tenths scale 14 are in descending order from bottom to top and the rod will therefore be a direct reading elevation rod. As can also be seen in FIG. 4A, the hundredths marking 16 are a set of marks designed and arranged such that, when one mark is sighted, the sighted mark in conjunction with at most one adjacent mark will uniquely identify the hundredths value.

The rod further includes a sliding scale member 18, shown in FIG. 3B, which is disposed behind the fixed scale 10 and carries a sequence of numbers which will display the units scale through the windows 12. The particular sequence of numbers to be carried on the sliding scale 18 will depend on a number of considerations to be described later, and an example is shown in more detail in FIG. 4B. In FIG. 4B, the sliding scale is provided with two number sequences designated Scale A and Scale B, respectively. The lefthand scale will be displayed in the fixed scale windows 12. Thus, Scale B can be employed by removing the sliding scale 18 entirely, reversing it, and reinserting it with Scale B now right side-up on the left of the sliding member 18. The rod further includes a rod housing member 20 in which both of the fixed and sliding scales 10 and 18 are slidably held. In the comtemplated mode of operation, fixed scale 10 will remain at a fixed position relative to the housing 20 and is slidable solely for the purpose of replacing the fixed scale. The sliding scale 18 is slidably adjustable with respect to the fixed scale 10 for the purpose of changing the values displayed through the windows 12. As shown in the cross-sectional view of FIG. 1B, the sliding scale 18 is slidable in an indentation 22 in the housing 20 behind the fixed scale 10.

On the upper side portion of the housing 20 is provided a click stop mechanism 24 (FIG. 2A) for holding the sliding scale in a desired position. This mechanism is shown in more detail in FIGS. 5A and 5B. As shown therein, the mechanism 24 may be mounted to the side of the housing 20 by a pair of screws 26, and the mechanism may include a pawl 28 and a spring 30 for urging the pawl inwardly to engage detents 32 spaced at regular intervals along the side of the sliding scale 18. The detents are spaced at intervals equal to the spacing of the numbers on the sliding scale. Since the scale 18 need only be slidable over a relatively short range, the detents 32 need only be provided along a portion at either end of the scale 18. Further, the detents are preferably provided on both sides of the sliding scale so that the scale 18 may be reversed.

The rod housing 20 is slidably mounted within an extension unit 34. When the housing 20 is extracted from the extension unit 34 to its fully extended position as shown in FIGS. 2A and 2B, an extension clip 36 will hold the housing 20 in its extended position. There is also a slot provided in the top of the housing 20 and extension unit 34 to hold the units in their retracted positions. The extension clip may be as shown in more detail in FIG. 6, with an end of the clip 36 engaging a notch 38 in the rear surface of housing 20. The clip 36 is preferrably provided with a grip 40 which can be pulled to release the clip and permit retraction of the housing 20 into the extension unit.

The extension unit 34 is itself slidably mounted within an outer housing 42. The unit 34 can be held in at least two positions, one being the fully retracted position of FIG. 1A and the other being a fully extended position shown in FIGS. 2A and 2B. When in its fully extended position, the extension unit 34 is held in position by a second extension clip 34 mounted on the outer housing 42 and operable in the same manner as the clip 36.

The final component of the rod is an adjustment leg 46 (FIG. 3F) which is slidable within a rear portion 42' of the outer housing 42. The leg 46 can be held in any position relative to the housing 42 by an adjustment clamp 48 which may be operable as shown in detail in FIGS. 7A and 7B.

Rods held in a non-vertical position will result in false readings. The viewer through the telescope can detect side-to-side errors by means of the cross hairs in the telecope, but can only detect front-to-back tilting by having the rod holder move the rod back and forth through the vertical plane to allow the viewer to determine the top-most reading. For this reason, the adjustment leg 46 may include a simple "bullseye" type bubble level 50 mounted on its upper end to allow the rod holder to position the rod at true vertical. A top view of the bubble level 50 is shown in FIG. 8.

Also, since the adjustment leg will support the rod, the leg should also be provided with an enlarged base plate 52 to prevent the rod from sinking into the ground during use.

The operation of the above-described grade rod is as follows. First, assume that the rod is designed to be extended in five-foot increments. The extension unit 34 may then be approximately six feet in length so that it can provide five feet of extension length while still leaving sufficient overlap with the housings 20 and 42 as shown in FIGS. 2A and 2B to maintain stability. The adjustment leg 46 would preferably be about four feet in length, to facilitate reading of the bubble 50, although other lengths could easily be used. It should be noted, however, that it would be a simple matter to design the rod for four and three foot extensions by using five and four foot extension units 34 and by re-designing the number sequences on the sliding member 18.

It should also be pointed out that the windows 12 in the fixed scale may be spaced at any desired interval, e.g. every tenth, quarter, half, etc., of a foot. Assuming some minimum number size required for easy readability, wider spacing of the windows will permit a longer sequence of numbers on the sliding member 18 to be hidden between the windows 12, thereby permitting greater variation in the numbers than can appear in each window. However, a wider spacing increases the possibility that a window will not appear in the limited field of vision of present telescopes utilized on transits and levels. Even when a sufficient length of rod is visible, wider number spacings require interpolation which slows the reading and provides further opportunity for error. Thus, my preferred embodiments described herein are directed to some of the sliding member sequences which I have developed for a window spacing of 0.25 feet and numbers approximately one-half inch high. This window spacing permits the display of any of five preselected numbers in each window. The window widths in some embodiments are limited to one digit, which means that only the last whole number of elevation is displayed.

A first type of operation uses the general purpose Scale A on the left-hand side of the sliding member 18 as it is illustrated in FIG. 4A. General purpose scales are selected for ease in calibrating the rod to various benchmark elevations. The Scale A in FIG. 4A, for instance, provides a zero center on a six foot rod, with the zero value being displayed in the center window $12_4$ of the fixed scale as shown in FIGS. 3A and 4B. The numbers on the scale are in descending order from the bottom to the top of the rod, and the rod thereby permits direct reading of grade elevations. For example, if the benchmark elevation is taken as one hundred feet, the rod will indicate 97.00 feet adjacent the window $12_1$ in FIG. 3A and will indicate 103.00 feet adjacent the window $12_7$ in FIG. 3A.

One drawback of such a rod, however, is that it is capable of reading elevations only 3 feet on either side of the benchmark. However, with the sliding member 18, the zero point can be moved to different positions on the rod with a very small adjustment. For example, sliding the member 18 of FIGS. 3B and 4A one notch in the upward direction will increase by one the values displayed in the windows, so that the zero point will now be indicated adjacent the window $12_3$ in FIG. 3A and the rod will read elevations from 98.00 feet to 104.00 feet. This can be more easily seen from the Scale A of FIG. 9 which is a condensed version of Scale A in FIG. 4B showing the number sequences as they would appear in a rod having windows only once per foot of rod length.

Moving the sliding member 18 in the downward direction by one notch will decrease all display members by one, and will move the zero point to the window $12_5$, with the scale indicating elevations between 96.00 and 102.00 feet. Moving the member 18 upward by two notches will increase all displayed numbers by 3, so that the zero point will be at the window $12_1$ and the rod will read elevations from 100.00 to 106.00 feet, and moving the member 18 downwardly by two notches will decrease all displayed values by three so that the zero point will be at the window $12_7$ and the rod will read elevations from 94.00 to 100.00 feet. Thus, the six foot rod is capable of reading a 12 foot range of elevations from 94.00 to 106.00 feet, all by moving the sliding member 18 a maximum of two notches, or about one-tenth of a foot, in either direction.

For special purpose applications where wide variations in grade elevations may occur, the extension capability of the rod will be highly advantageous. A sliding scale having a sequence of numbers corresponding to the extension lengths can greatly increase the effective length of the rod while still requiring calibrations which extend only over a 6 foot length. One example is the Scale B shown upside down on the right-hand side of sliding member 18 in FIG. 4A, and shown in condensed form in FIG. 9. With the sliding member 18 in its center position, the window $12_4$ at the center of the fixed scale would indicate an elevation of 100.00 feet, and the rod would read elevations from 97.00 to 103.00 feet. At the benchmark, the holder would adjust the adjustment leg 46 until the telescope sighted on the zero center of the rod. As the holder then proceeded down the grade, he would reach an elevation of 97.00 feet where the telescope would be reading from window $12_1$ at the top of the rod. At this time, the sliding member 18 would be raised one notch and either the housing 20 or the extension unit 34 would be extended five feet until latched by the clips 36 or 44. The telescope would now be sighted on the window $12_6$ and, with the sliding member 18 having been raised one notch, the window $12_6$ will now be reading 97.00 feet.

As the holder continues down the grade, he will arrive at an elevation of 92.00 feet where the telescope is again reading from the window $12_1$. At this point, the remaining one of the housing 20 and extension unit 34 can be extended while raising the scale 18 by one additional notch, and the telescope will then be reading 92.00 feet from the window $12_5$. The rod can thus measure elevations from 87.00 to 103.00 feet, or a range of 16 feet, with only a 6 foot length of calibrated rod. Additional telescoping sections on the rod would, of course, provide an even further increased effective length while utilizing the same fixed and sliding scales.

If the holder will be proceeding up-grade, he can begin with the rod in its fully extended position as shown in FIGS. 2A and 2B, and can slide the sliding member 18 downwardly by one notch each time a rod section is collapsed. With two telescoping sections as in the example described above, the rod could then measure elevations from 97.00 to 113.00 feet.

Scales C and D in FIG. 9 are also designed for rods having five-foot extension lengths, with Scale C providing a zero point at the top of the rod in window $12_1$ and Scale D providing a zero point at the bottom of the rod in window $12_7$. These scales could be carried on the other side of the sliding member 18 of FIG. 4A, thus enabling any one of four scales to be used with only a single sliding scale member.

Depending on the desired versatility, the rod housing can be modified to accommodate flat inserts with one, two or four scales (as in the case of the double-sided scale of FIG. 4A), square inserts with up to eight scales, or multiple inserts. By making the width of the insert twice that of the display window, a different scale can be provided on each half of the display face. Also, the rod lengths and the number of telescoping sections can be varied as desired.

Figure 10B:
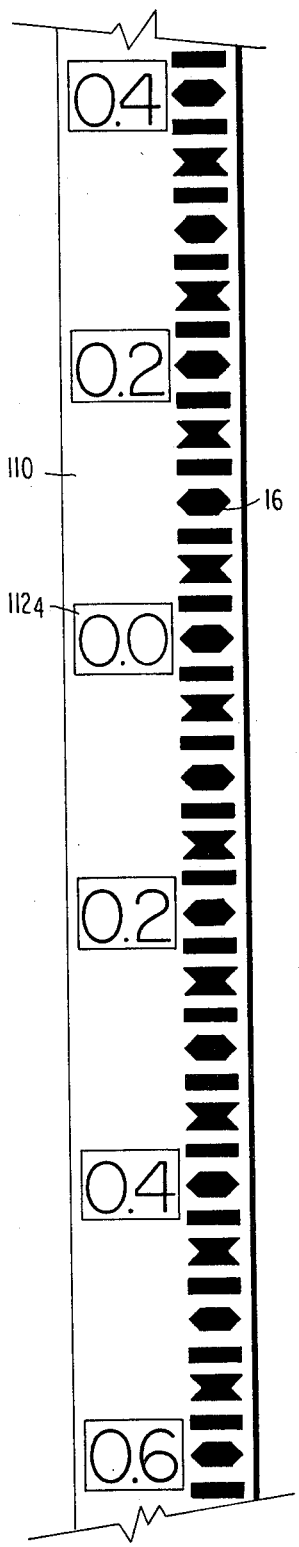
FIG. 10B is an exploded view of a portion of a fixed scale member for a cut-and-fill rod according to the present invention.

For cut-and-fill applications, a rod having a zero center with values increasing on either side of center is needed. When calibrated, the rod will give a direct reading of how far other spot elevations are above or below grade relative to a reference point. This type of rod could be obtained with the sliding and fixed scales as shown in FIGS. 10A and 10B. As shown in FIG. 10B, fixed scale 110 would be provided with windows 112 which would be two digits wide instead of one digit wide as in the previous examples. There would be no fixed numbers on the scale 110, but it would be provided with gradation markings 116 identical to those of the earlier examples. In the examples shown in FIGS. 10A and 10B, the windows 112 are provided at a frequency of five per foot on a six-foot rod, although other rod lengths and window spacings could be employed.

When calibrated to the center scale on the sliding scale 118 of FIG. 10A, the rod would give direct readings of ±3 feet with minus readings to be indicated in red. Shifting the sliding scale by one notch in the up or down directions would change the readings on the rod to thereby effectively raise or lower the zero point, respectively, by five feet. In one example of operation, assuming a rod such as shown in FIGS. 2A and 2B being capable of two five-foot extensions, the holder could begin with one of the housing 20 or extension unit 34 in its extended position and the rod calibrated to the center scale. When an elevation of +3.00 feet is read from the bottom window on the fixed scale (corresponding to window $12_7$ in FIG. 3A), the extended section would be collapsed and the sliding scale 118 moved downwardly by one notch so that the telescope would now be cited on the window corresponding to the window $12_2$ in FIG. 3A and would still read +3 feet. The rod could then be used to measure elevations up to +8.00 feet. Similarly, readings down to −8.00 feet could be taken by extending the rod an additional five feet and moving the sliding scale 118 upwardly by one notch. This provides an effective rod length of 16 feet with only a six foot length of calibrated rod.

A number of variations could be made and/or accessories added to the above-described grade rods to further improve their usefulness for certain special purposes, some of which will now be described.

To obtain a dual purpose rod, a topographical (FIG. 4A) scale and a cut-and-fill (FIG. 10B) scale could be placed side-by-side. The cut-and-fill scale would be slidable so that its zero center could be positioned anywhere along the length of the rod. Once the topographical scale has been calibrated to a given reference point, the cut-and-fill scale can be positioned to show the amount of cut-and-fill from that reference point. When utilizing a known laser level, a grading equipment operator can read the rod directly, thereby eliminating the need for setting and/or resetting the "blue top" grade stobs.

A further modification would be a cut-and-fill grader's rod which could be obtained by adding a simple elevation indicator to the cut-and-fill rod described above with reference to FIGS. 10A and 10B. The cut-and-fill grader's rod could be calibrated using a pre-calibrated topographical rod, and the indicator could then be set to read the elevation level which its zero center indicates. The rod holder would always know the elevation of the zero center, and the rod would therefore serve the same purpose as the dual purpose rod described above.

A useful accessory would be a grade indicator attachment comprising two clear tubes having gradation markings, and a flexible tube portion coupling the bottoms of the two clear tubes. The tubes could be filled with a liquid so that the gradation markings would indicate the relative elevations of the two tubes. As shown in FIG. 11A, one of the tubes 150 could be attached to a direct reading grade rod 152 according to this invention, and the other tube 154 could be attached to a plain rod 156. Once the grade rod 152 is calibrated to a given reference point, the position of the tube 154 on the rod 156 could be adjusted so that the distance from the zero indicator of tube 154 to the bottom of the rod 156 is the same as the distance from the zero indicator of the tube 150 to the bottom of the adjustment leg of the rod 152. Adjustment clamps 155 could be provided on both rods for this purpose and would be operable in a manner similar to the clamp 48 in FIGS. 7A and 7B.

To set grade stobs at subsequent spot elevations, the viewer has the rod holder readjust the grade rod 152 so that it indicates a desired elevation. When rod 156 is placed on top of the grade stob, the liquid level will indicate when the top of the grade stob is also at the desired elevation. The liquid level attachment therefore eliminates the time-consuming process of the viewer having to make a series of rod readings in setting the stobs accurately. It also shows the stob setter how much the stob is off and greatly shortens the entire process. FIGS. 11B and 11C illustrate a modified rod housing 42 for this embodiment and a housing 43 for the plain rod, respectively.

A still further accessory would be to add an electrical switch to the liquid level indicator described above. The switch could in turn operate either an air valve on an air hammer, or could control power to an electric hammer. As the stob is hammered down, the hammer will automatically be turned off when the power elevation is reached.

A still further modification could be employed with laser beam reading devices. In the examples described above, the calibrated portion is itself extended into the line-of-sight of the telescope, and therefore constitutes the "target". Instead, the calibrated portion could act as a stationary rod housing, with the adjustment leg 46 extending downwardly and the extension units extending up out of hollow sections in the rear portion of the housing. When the laser strikes the calibrated portion, the elevation would be read directly from the rod as in the above embodiments. For extended length operation, the extension units would have a target on top which would be aligned with the horizontal laser beam, and the elevations would be read from the calibrated portion opposite an indicator attached to the lower portion of the extension unit. Once the extension comes into play, the numbers previously at the top of the rod would now be read five feet down on the calibrated portion, as in the previously described embodiments.

Figure 15A:
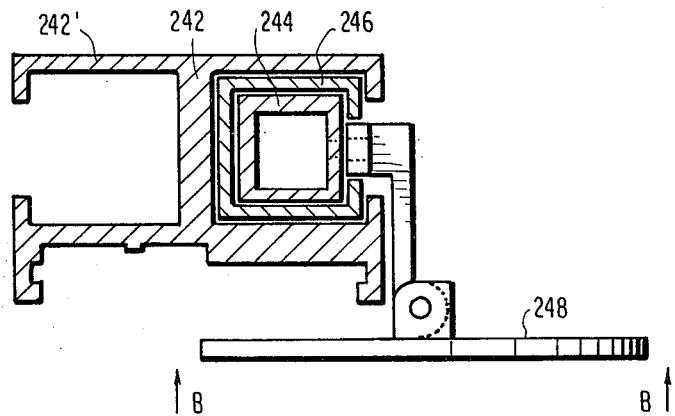
FIGS. 15A–15C illustrate portions of a laser rod embodiment of the present invention.
Figure 15B:
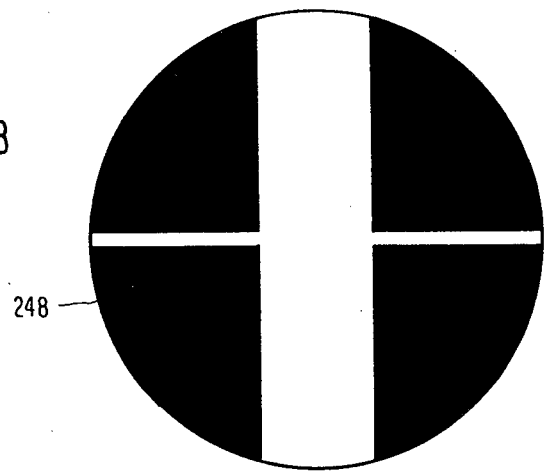
Figure 15C:
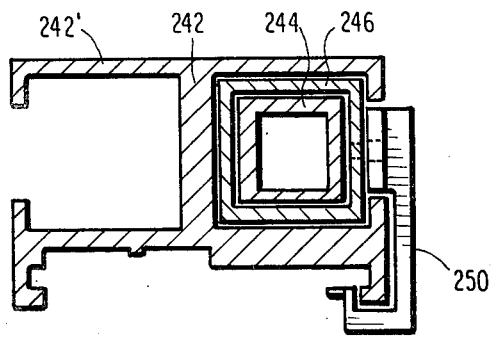

FIGS. 15A–15C illustrate pertinent components of the above-described laser rod. FIG. 15A illustrates a modified housing 242 in which the housing portion 242' for the adjustment leg 46 would be to one side rather than in the rear as in the embodiment of FIGS. 1–3. Extension units 244 and 246 are slidable in the housing, and a target 248 is secured to one of the extension units 244. FIG. 15B is a view along line B—B of FIG. 15A and illustrates the front face of the target.

A pointer assembly 250 shown in FIG. 15C is secured to the sliding extension 246 near the lower end thereof. For the first extension increment, the units 244 and 246 can be raised together, with the pointer 250 indicating the elevation from the calibrated scale on the front face of the rod. When the pointer 250 approaches the top of the calibrated scale, the units 244 and 246 could be extended relative to one another, and the unit 246 would begin again from a position retracted within the housing 242. The units 244 and 246 would again be raised together, with readings being indicated by the pointer 250.

In a further modification, it might be desirable to provide an electronic digital read-out for the rod. There would be many ways of implementing such a read-out, and one would be as illustrated in FIGS. 12A–12D. The description which follows will be given with reference to a six-foot rod having only one unit display per foot, although this is only by way of example. As shown in FIG. 12A, 7-segment bulb or light-emitting diode (LED) display units could be employed for each of the six displays A–F. A stationary contactor board 170, as shown in FIGS. 12B and 12C, would be a non-conductive member for housing six rows of seven contacts each, with each contact 172 being spring-biased toward the moving contactor board 174, shown in FIGS. 12C and 12D. The moving contact board would be a conductive plate with appropriate spots drilled out and filled with non-conductive material. The non-conductive spots, when aligned with any of the contacts 172, will cut off power to the corresponding LED segment to obtain the desired sequence of numbers.

The switching arrangement of FIGS. 12A–12D would be readily adaptable to longer rod lengths by merely adding a further row of contacts 172 to the stationary contactor board 170.

It should be noted that the arrangement illustrated in FIGS. 12A–12D will result in a displayed number sequence which decreases from the top to the bottom of the rod. Obviously, the pattern of indentations on the contactor board 174 could be changed to provide a sequence which ascends from the top of the rod to the bottom.

A further modification to this electronic display rod would be to provide each foot of the rod with seven rows of fixed contactors for units, tenths and hundredths, with the length of each contactor being equal to the unit it represents. The contactors for tenths and hundredths (from 2 to 7 depending on the numeral to be displayed) would be constantly energized, and the sets of seven contactors for whole units would be energized via an encoder switch such as illustrated in FIGS. 12B–12D. A single moving contactor would house the seven bulb digital display lamps and a "target" which, when aligned with the cross hair or laser beam, would automatically display the elevation to the nearest hundredth. No display would occur between contactors which would require sliding the moving contactor a fraction to determine which half a hundredth was not being displayed. The moving contactor would actually be attached to the lower portion of an extension unit and would be moved by sliding the extension. When the extension unit actually comes into play, the target would be moved to any of six other positions on the extension (spaced at one foot intervals), and the encoder switch positioned accordingly to maintain continuity of calibration.

A still further alternative may be to provide only a single row of contacts with a decoder and driver at each LED display. This would permit the displays to be changed in any sequence as the contacts slide.

A second embodiment of the invention will now be described with reference to FIGS. 13A–13D. This embodiment may be referred to as a "universal grade rod" due to its capability of being switched from a direct reading elevation rod to a depth reading rod or to a cut-and-fill rod by merely sliding two scales a fraction of a foot in either direction.

Referring first to FIG. 13A, the fixed scale 210 may be similar to the scale 10 of FIG. 3A in that it would include gradation markings 216 and a plurality of windows. However, it would not include fixed tenths values but instead would provide windows for displaying both the units and tenths values. While a series of double-digit windows as in the scale of FIG. 10B may suffice, I prefer to provide in this embodiment a series of units value windows 212 which may occur, e.g. every 0.25 feet, and a series of tenths value windows 213 which may occur every 0.10 feet as shown in FIG. 13A. When the windows occur simultaneously every 0.50 feet, they may be combined into a single two-digit window.

The units scale display would be provided by a sliding member similar to the member 18 in FIG. 3B, with the scale being replaceable to implement different rod functions. Two examples are shown in FIGS. 13B and 13C, and these could be printed on opposite sides of the same sliding member. FIG. 13B illustrates a scale having a "7" at its center point and providing unit displays in the windows 212 which will decrease toward the top of the rod. This will obtain a direct reading elevation rod with the zero point at the bottom of the six-foot rod. The number sequence on the member of FIG. 13B would permit the zero point to be moved to five of the seven positions on a six foot rod.

FIG. 13C illustrates a sliding scale which could be printed on the backside of the sliding member of FIG. 13B and would provide a universal scale.

The values which would be displayed in the unit windows with either of scale E (FIG. 13C) or scale F (FIG. 13B) are set forth in the following Table I. In Table I, the unit windows 212 are numbered from top to bottom of a six-foot rod with the top windows being designated W1.0 and the bottom window being designated W7.0. The position designations are D2, D1, C U1 and U2, with C indicating the number sequence which would be displayed with the scale in its center position, D1 indicating the number sequence which would be displayed with the scale lowered by one notch, U1 indicating the number sequence which would be displayed with the scale raised by one position, etc.

Position C provides numbers ascending away from the center of the rod, with negative numbers being displayed in red. Positions U1 and U2 provide numbers ascending from the bottom to the top of the rod in red and maintain continuity of calibration with 5-foot extensions in the direct reading of cut elevations or conventional (depth) readings. Positions D1 and D2 provide numbers ascending from the top of the rod to the bottom of the rod in black and maintain continuity of calibration with 5-foot extensions in the direct reading of fill or elevations.

A sixth position could be added to the slide F in FIG. 13B so that the number sequence 3, 4, 5, 6, 7, 8, 9 would be displayed in the U3 position in the whole foot window locations W1.0, W2.0, W3.0, ... W7.0. This sixth position could be added by closer spacing without making the numbers any smaller, although a combination of closer spacing in slightly smaller numbers may be more practical. Even with three sets of numbers, the two pairs (X±5 and Y±5) that fail to appear in any given window will appear in the windows one foot above and one foot below, therefore making the rod capable of continuity of calibration. Adding the sixth position presents four out of five possible pairs in each window.

In any of the three functions of the slide of FIG. 13C, the effective length of the rod is limited only by the number of extension units. The Universal Rod is therefore continuously calibratable and maintains continuity of calibration when using 5-foot extensions in measuring from $-\infty$ through 0 to $+\infty$ in the cut and fill or direct reading elevation modes, and from 0 to $-\infty$ in the conventional or depth modes. After calibration, the maximum movement of the slide is only ±0.05 feet in reading elevations and ±0.10 feet in measuring cut and fill.

TABLE I

| Positions | NUMBER DISPLAYED ||||||||||
|---|---|---|---|---|---|---|---|---|---|---|
| | SCALE E ||||| SCALE F |||||
| | D2 | D1 | C | U1 | U2 | D2 | D1 | C | U1 | U2 |
| WINDOW # | | | | | | | | | | |
| W 1.0 | 7 | 2 | −3 | −8 | −3 | 0 | 5 | 4 | 9 | 8 |
| W 1.25 | 7 | 2 | −2 | −7 | −2 | 0 | 5 | 4 | 9 | 8 |
| W 1.5 | 7 | 2 | −2 | −7 | −2 | 0 | 5 | 4 | 9 | 8 |
| W 1.75 | 7 | 2 | −2 | −7 | −2 | 0 | 5 | 4 | 9 | 8 |
| W 2.0 | 8 | 3 | −2 | −7 | −2 | 1 | 6 | 5 | 0 | 9 |
| W 2.25 | 8 | 3 | −1 | −6 | −1 | 1 | 6 | 5 | 0 | 9 |
| W 2.5 | 8 | 3 | −1 | −6 | −1 | 1 | 6 | 5 | 0 | 9 |
| W 2.75 | 8 | 3 | −1 | −6 | −1 | 1 | 6 | 5 | 0 | 9 |
| W 3.0 | 9 | 4 | −1 | −6 | −1 | 2 | 7 | 6 | 1 | 0 |
| W 3.25 | 9 | 4 | −0 | −5 | −0 | 2 | 7 | 6 | 1 | 0 |
| W 3.5 | 9 | 4 | −0 | −5 | −0 | 2 | 7 | 6 | 1 | 0 |
| W 3.75 | 9 | 4 | −0 | −5 | −0 | 2 | 7 | 6 | 1 | 0 |
| W 4.0 | 0 | 5 | 0 | −5 | −0 | 3 | 8 | 7 | 2 | 1 |
| W 4.25 | 0 | 5 | 0 | −4 | −9 | 3 | 8 | 7 | 2 | 1 |
| W 4.5 | 0 | 5 | 0 | −4 | −9 | 3 | 8 | 7 | 2 | 1 |
| W 4.75 | 0 | 5 | 0 | −4 | −9 | 3 | 8 | 7 | 2 | 1 |
| W 5.0 | 1 | 6 | 1 | −4 | −9 | 4 | 9 | 8 | 3 | 2 |

TABLE I-continued

| Positions | NUMBER DISPLAYED ||||||||||
|---|---|---|---|---|---|---|---|---|---|---|
| | SCALE E ||||| SCALE F |||||
| | D2 | D1 | C | U1 | U2 | D2 | D1 | C | U1 | U2 |
| W 5.25 | 1 | 6 | 1 | −3 | −8 | 4 | 9 | 8 | 3 | 2 |
| W 5.5 | 1 | 6 | 1 | −3 | −8 | 4 | 9 | 8 | 3 | 2 |
| W 5.75 | 1 | 6 | 1 | −3 | −8 | 4 | 9 | 8 | 3 | 2 |
| W 6.0 | 2 | 7 | 2 | −3 | −8 | 5 | 0 | 9 | 4 | 3 |
| W 6.25 | 2 | 7 | 2 | −2 | −7 | 5 | 0 | 9 | 4 | 3 |
| W 6.5 | 2 | 7 | 2 | −2 | −7 | 5 | 0 | 9 | 4 | 3 |
| W 6.75 | 2 | 7 | 2 | −2 | −7 | 5 | 0 | 9 | 4 | 3 |
| W 7.0 | 3 | 8 | 3 | −2 | −7 | 6 | 1 | 0 | 5 | 4 |

Instead of the fixed tenths scale of FIG. 3A, the tenths display in this embodiment is provided by a pair of sliding scales 220 and 222 shown in FIG. 13D. The sliding scale 220 will have two sequences of numbers, the first being the descending sequence A formed by alternate numbers beginning with the penultimate numeral "9" near the bottom of the member 220, and the second being an ascending sequence A' formed by alternate numbers beginning with the number "1" at the bottom of the member 220. This second sequence should be printed in red, since it will be used to indicate negative elevations as will be described below.

The sliding member 222 will also have two sequences of numbers, the first being an ascending sequence B formed by alternate numbers beginning with the number "0" at the top of the member 222, and the second being a descending sequence B' formed by alternate numbers and beginning with the penultimate number "0" near the top of the member 222. This second sequence B' should be printed in red similar to the sequence A' on the member 220.

The sequences A, A', B and B' of FIG. 13D and the windows in which they would appear are illustrated in the following Table II.

TABLE II

| Positions→ | SLIDE A-B ||
|---|---|---|
| | A | A' |
| WINDOW # | | |
| ↑ | ↑ | ↑ |
| etc. | etc. | etc. |
| W 2.9 | 9 | −1 |
| W 3.0 | 0 | −0 |
| W 3.1 | 1 | −9 |
| W 3.2 | 2 | −8 |
| W 3.3 | 3 | −7 |
| W 3.4 | 4 | −6 |
| W 3.5 | 5 | −5 |
| W 3.6 | 6 | −4 |
| W 3.7 | 7 | −3 |
| W 3.8 | 8 | −2 |
| W 3.9 | 9 | −1 |
| Positions→ | B | B' |
| W 4.0 | 0 | −0 |
| W 4.1 | 1 | −9 |
| W 4.2 | 2 | −8 |
| W 4.3 | 3 | −7 |
| W 4.4 | 4 | −6 |
| W 4.5 | 5 | −5 |
| W 4.6 | 6 | −4 |
| W 4.7 | 7 | −3 |
| W 4.8 | 8 | −2 |
| W 4.9 | 9 | −1 |
| W 5.0 | 0 | −0 |
| W 5.1 | 1 | −9 |
| etc. | etc. | etc. |
| ↓ | ↓ | ↓ |

As in Table I, the negative numbers would actually be printed on the sliding members without the negative sign but would be instead printed in red.

By sliding the two sliding scale halves 220 and 222 independently, three separate types of rods can be created. Using scale A from slide 220 and scale B from slide 222 will provide numbers in ascending order from the top of the rod to the bottom of the rod as is required in a direct reading elevation rod. Scale F in FIG. 13B could combine with scale A on slide 220 and scale B on slide 222 to provide a direct reading grade rod for use with five foot extensions for zero positions other than the center position. Scale E in positions D2 or D1 could be combined with scales A and B to provide 0 or 5 foot center positions. Note also that scale F at positions D2 and D1 and scale E at position U1 maintain continuity of calibration.

Using scale A' from member 220 and scale B from member 222 will provide tenths which increase on either side of a zero center to permit direct reading of plus or minus grade variations for cut-and-fill applications. Thus, scale E of FIG. 13C in various combinations with scales A, A', B and B' would produce a direct measurement of cut-and-fill. For example, position C of slide E in combination with scales A' and B would produce cut-and-fill readings from −3 feet to +3 feet, while the U1 position of slide E together with sequences A' and B' from FIG. 13D would provide one five-foot extension adjustment and the U2 position of slide E together with sequence A' and B' would provide a second five-foot adjustment. Similarly, position D1 in combination with sequences A and B would provide a first five-foot extension in the other direction and position D2 with scales A and B would provide a second five-foot extension in the other direction. Accordingly, slide E of FIG. 13C and various combinations of scales A, A', B and B' would provide direct measurements of cut-and-fill over a continuous 26-foot range from −13 feet to +13 feet with only two extension units. A third extension unit would provide ±18 feet, etc.

A conventional depth reading rod with numbers increasing from the bottom to the top of the rod could be obtained by using a scale A' from member 220 and scale B' of member 222. Positions U2 and U1 of scale E would then provide a units scale adjustable for five-foot extensions.

Another possible scale for the units display would be as shown in the following Table III, with only the values displayed at whole foot positions being listed since the remaining values are repetitious. Using a sliding units scale member having the sequences of Table III, positions C, D1 and D2 in conjunction with a tenths scale AB from FIG. 13D would provide a direct reading grade rod with units and tenths in descending order from the bottom to the top of the rod, with the zero point at either the center, bottom or top of the rod.

TABLE III

| Positions | D2 | D1 | C | U1 | U2 | U3 |
|---|---|---|---|---|---|---|
| WINDOW # | | | | | | |
| W 1.0 | 0 | 4 | 7 | −3 | −6 | −10 |
| W 2.0 | 1 | 5 | 8 | −2 | −5 | −9 |
| W 3.0 | 2 | 6 | 9 | −1 | −4 | −8 |
| W 4.0 | 3 | 7 | 0 | 0 | −3 | −7 |
| W 5.0 | 4 | 8 | 1 | 1 | −2 | −6 |
| W 6.0 | 5 | 9 | 2 | 2 | −1 | −5 |
| W 7.0 | 6 | 0 | 3 | 3 | 0 | −4 |

Table III shows a scale for a rod of approximately four feet either inches in length. Extension #1 would have two positions, one at three feet for use with positions D1 and U1 and another at 3.5 feet which, when added to a 3.5 foot extension unit #2 would maintain calibration with positions D2 and U2. Position U1 in conjunction with tenths scales A'B would provide a cut-and-fill rod with units and tenths in ascending order away from a zero center. Positions U2 and U3 and scales A'B' could then be used with non-calibrated 3-foot and 4-foot extensions to extend the cut measurement, while positions D1 and D2 and scales AB could be used to extend the fill measurement.

A conventional depth reading rod could be obtained by using positions U2 and U3 in conjunction with scales A'B', with position U2 displaying the zero position at the bottom and position U3 displaying 10 at the top.

The unit sequences in Table III were chosen simply to illustrate the versatility in shifting the zero position from the center to the bottom or top of the rod and to demonstrate continuity of calibration for fixed extensions of other than five feet. Different sequences could be used, for example, if five-foot extensions were to be employed, and additional sequences could be employed if it were acceptable to either decrease the numeral size or increase the interval between display windows.

A further modification which will now be described would permit the display of elevations up to five figures. This modification comprises the addition of windows in the fixed scale member spaced, e.g. at intervals of one-half foot and located in the tens position. The sequencing which will now be described is for use with 0/100 centered rods with five-foot extensions, but the same sequence would of course work for zero locations other than center, extension lengths of other than five feet, and on metric rods. Further, the same display system could be used not only for tens but also for the display of hundreds, thousands, etc.

A tens position sliding scale would be provided in two parts, similar to the two parts 220 and 222 in FIG. 13D, with the upper half being designated scale "T" and the lower half being designated scale "T'". The separation point of the two halves would be between the center window W4.0 and the next higher tens display window W3.5. Separate sliding halves are used since addition by units of five will result in a change on one-half of the rod at a time, and splitting the slide in half cuts the number of numerals in each sequence in half. This permits a shorter slide and also permits display at intervals of one-half foot instead of one foot.

Suitable number sequences to be displayed may be as shown in the following Table IV:

TABLE IV

| Positions | NUMBER DISPLAYED | | | | | | | | | |
|---|---|---|---|---|---|---|---|---|---|---|
| | D4 | D3 | D2 | D1 | C | U1 | U2 | U3 | U4 | U5 |
| SCALE T | | | | | | | | | | |
| WINDOW | 4 | 3 | 2 | 1 | 0 | 9 | 8 | 7 | 6 | 5 |
| W 1.0 | 4 | 3 | 2 | 1 | 0 | 9 | 8 | 7 | 6 | 5 |
| W 1.5 | 4 | 3 | 2 | 1 | 0 | 9 | 8 | 7 | 6 | 5 |
| W 2.0 | 4 | 3 | 2 | 1 | 0 | 9 | 8 | 7 | 6 | 5 |
| W 2.5 | 4 | 3 | 2 | 1 | 0 | 9 | 8 | 7 | 6 | 5 |
| W 3.0 | 4 | 3 | 2 | 1 | 0 | 9 | 8 | 7 | 6 | 5 |
| W 3.5 | 4 | 3 | 2 | 1 | 0 | 9 | 8 | 7 | 6 | 5 |
| SCALE T' | | | | | | | | | | |
| W 4.0 | 4 | 3 | 2 | 1 | 0 | 9 | 8 | 7 | 6 | 5 |
| W 4.5 | 4 | 3 | 2 | 1 | 0 | 9 | 8 | 7 | 6 | 5 |
| W 5.0 | 4 | 3 | 2 | 1 | 0 | 9 | 8 | 7 | 6 | 5 |
| W 5.5 | 4 | 3 | 2 | 1 | 0 | 9 | 8 | 7 | 6 | 5 |
| W 6.0 | 4 | 3 | 2 | 1 | 0 | 9 | 8 | 7 | 6 | 5 |

TABLE IV-continued

| Positions | NUMBER DISPLAYED | | | | | | | | | |
|---|---|---|---|---|---|---|---|---|---|---|
| | D4 | D3 | D2 | D1 | C | U1 | U2 | U3 | U4 | U5 |
| W 6.5 | 4 | 3 | 2 | 1 | 0 | 9 | 8 | 7 | 6 | 5 |
| W 7.0 | 4 | 3 | 2 | 1 | 0 | 9 | 8 | 7 | 6 | 5 |

The most popular application of this type of rod would be on a rod designated for architects and contractors. Architects, as opposed to surveyors and civil and highway engineers, are not concerned with grade variations above or below sea level and are seldom concerned with site variations greater than ±20 feet. Consequently, their site plans generally reference an on-site benchmark with an assumed elevation of 100 feet, with lower grades in descending numbers and higher grades in ascending numbers. One such rod could comprise a fixed scale for display of tenths and hundredths identical to that shown in FIG. 4A, two-position sliding units scale which would display units at windows located every tenth of a foot (this close window spacing is possible since the value of each displayed unit will change by ±5 in a repetitive fashion and it is therefore necessary to have only two possible values for display in each window with the scale being slid back and forth), and a two-place tens of units sliding scale with window locations every one-half foot. The tens scale slide could be a two-piece slide as described above, but could have the number sequences shown in Table V to permit multiple extensions in increments of five feet and provide direct measurements from elevations of 47-143 feet.

TABLE V

| Positions | NUMBER DISPLAYED | | | | | | | | | |
|---|---|---|---|---|---|---|---|---|---|---|
| | D4 | D3 | D2 | D1 | C | U1 | U2 | U3 | U4 | U5 |
| WINDOW # | | | | | | | | | | |
| TOP | | | | | | | | | | |
| W 1.0 | 14 | 13 | 12 | 11 | 10 | 9 | 8 | 7 | 6 | 5 |
| W 1.5 | 14 | 13 | 12 | 11 | 10 | 9 | 8 | 7 | 6 | 5 |
| W 2.0 | 14 | 13 | 12 | 11 | 10 | 9 | 8 | 7 | 6 | 5 |
| W 2.5 | 14 | 13 | 12 | 11 | 10 | 9 | 8 | 7 | 6 | 5 |
| W 3.0 | 14 | 13 | 12 | 11 | 10 | 9 | 8 | 7 | 6 | 5 |
| W 3.5 | 14 | 13 | 12 | 11 | 10 | 9 | 8 | 7 | 6 | 5 |
| BOTTOM | | | | | | | | | | |
| W 4.0 | 14 | 13 | 12 | 11 | 10 | 9 | 8 | 7 | 6 | 5 |
| W 4.5 | 14 | 13 | 12 | 11 | 10 | 9 | 8 | 7 | 6 | 5 |
| W 5.0 | 14 | 13 | 12 | 11 | 10 | 9 | 8 | 7 | 6 | 5 |
| W 5.5 | 14 | 13 | 12 | 11 | 10 | 9 | 8 | 7 | 6 | 5 |
| W 6.0 | 14 | 13 | 12 | 11 | 10 | 9 | 8 | 7 | 6 | 5 |
| W 6.5 | 14 | 13 | 12 | 11 | 10 | 9 | 8 | 7 | 6 | 5 |
| W 7.0 | 14 | 13 | 12 | 11 | 10 | 9 | 8 | 7 | 6 | 5 |

An alternative configuration would be to use a one-piece tens sliding scale having the values as shown in Table VI for direct measurement of elevations of 72-123 feet.

TABLE VI

| Positions | NUMBER DISPLAYED | | | | | | | | | |
|---|---|---|---|---|---|---|---|---|---|---|
| | D4 | D3 | D2 | D1 | C | U1 | U2 | U3 | U4 | U5 |
| Window # | | | | | | | | | | |
| W 1.0 | 11 | 11 | 10 | 10 | 9 | 9 | 8 | 8 | 7 | 7 |
| W 1.5 | 11 | 11 | 10 | 10 | 9 | 9 | 8 | 8 | 7 | 7 |
| W 2.0 | 11 | 11 | 10 | 10 | 9 | 9 | 8 | 8 | 7 | 7 |
| W 2.5 | 11 | 11 | 10 | 10 | 9 | 9 | 8 | 8 | 7 | 7 |
| W 3.0 | 11 | 11 | 10 | 10 | 9 | 9 | 8 | 8 | 7 | 7 |
| W 3.5 | 11 | 11 | 10 | 10 | 9 | 9 | 8 | 8 | 7 | 7 |
| W 4.0 | 12 | 11 | 11 | 10 | 10 | 9 | 9 | 8 | 8 | 7 |
| W 4.5 | 12 | 11 | 11 | 10 | 10 | 9 | 9 | 8 | 8 | 7 |
| W 5.0 | 12 | 11 | 11 | 10 | 10 | 9 | 9 | 8 | 8 | 7 |
| W 5.5 | 12 | 11 | 11 | 10 | 10 | 9 | 9 | 8 | 8 | 7 |

TABLE VI-continued

| Positions | NUMBER DISPLAYED | | | | | | | | | |
|---|---|---|---|---|---|---|---|---|---|---|
| | D4 | D3 | D2 | D1 | C | U1 | U2 | U3 | U4 | U5 |
| W 6.0 | 12 | 11 | 11 | 10 | 10 | 9 | 9 | 8 | 8 | |
| W 6.5 | 12 | 11 | 11 | 10 | 10 | 9 | 9 | 8 | 8 | |
| W 7.0 | 12 | 11 | 11 | 10 | 10 | 9 | 9 | 8 | 8 | 7 |

All three of the above tables are for rods with windows of tens of units at intervals of one-half foot. Obviously, a window frequency of one per foot would double the range of measurement for each slide. Table VI, for instance, could be expanded to provide for the direct measurement of elevations from 0-200 feet.

Further, four separate slides similar to that described in Table III would provide for the continuous display and direct reading of elevations from zero to in excess of that of Mt. Everest, and no single slide would move more than ±½ foot.

FIGS. 16A-16H illustrate one example of an architectural rod as described above. FIG. 16A illustrates a fixed scale for tenths and hundredths with unit windows located every tenth of a foot and two-place tens of units windows at half foot intervals. Note that the hundredths gradation markings in FIG. 16A differ somewhat from the markings 16 shown in FIG. 4A. More particularly, the gradation markings 161 and 162 are asymmetrical so that in all cases the hundredths gradation marking will uniquely identify a respective value without the need to compare two adjacent markings.

FIG. 16B illustrates a two-position sliding units scale which will display units in the unit windows at 0.10 foot intervals in the fixed scale of FIG. 16A. FIG. 16C illustrates a two-place tens of units sliding scale which preferably carries five possible numbers to be displayed in each of the tens of units display windows in the fixed scale of FIG. 16A.

FIG. 16C illustrates a modified housing for the architectural rod designed for laser reading. The housing 342 would include a side portion 342' for housing an adjustment leg 346. The fixed scale member 348 would be of the type shown in FIG. 16A and would be supported at the front of the housing 42. Behind the fixed scale member 348 would be a tens of units sliding scale 350 of the type shown in FIG. 16C and a units sliding scale 352 of the type shown in FIG. 16B. The right side of the housing 42 would contain a plurality (e.g. two) sliding extensions 344 and 345 which would operate in the manner described with reference to FIGS. 15A-15C. A laser target would be fixed to the sliding member 344.

FIGS. 16E-16H illustrate the assembled architectural rod from various views. FIG. 16E is a front view of the assembled rod showing the target 348 near the upper portion of the rod. FIG. 16F is a view from the left side of FIG. 16E and shows more clearly the adjustment clamp 350 used to secure the position of the adjustment leg 346 within the adjustment leg housing portion 342'. FIG. 16G is a view from the right-hand side of FIG. 16E and illustrates the clamping members 354 and 356. FIG. 16H is a rear view of the rod assembly in its extended position.

The same systems described above could be applied to metric measurements, as will be described with reference to FIGS. 14A-14F. As shown in FIG. 14A, the fixed scale 310 includes gradation markings to indicate millimeters, a first column of windows 312 displaying decimeters and meters, and a second column of windows 313 for displaying centimeters. The windows for centimeters are to facilitate reversing the scales for universal measurements, and the windows for decimeters are provided to enable continuous calibration in half meter increments. A direct reading grade rod could have fixed scales for both, if these capabilities were not desired.

Scales G and H shown in FIGS. 14B and 14C, respectively, could be printed on opposite sides of a single sliding member 318, will permit calibrating any portion of the rod to read any half-meter increment from 0–9.5, and would provide continuity of measurement for extensions of 0.5, 1.0 and 1.5 meters. Scale I shown in FIG. 14D permits calibrating any one-meter portion of the rod to read any number 0 through 9 and provides continuity of measurement for extensions of one meter. A two-meter rod would have extensions 1.5 meters long with stop points at one meter for the first extension unit, at 0.5 and 1.5 meters for the second extension unit, etc. The numerals displayed for various positions of the slides 320 and 322 in FIG. 14F and the scales G–J in FIGS. 14B–14D are illustrated in the following Tables VII–XI.

TABLE VII

| Positions→ | TENTHS SCALE A-B | |
|---|---|---|
| | A | A' |
| WINDOW # ↑ | | |
| etc. | etc. | etc. |
| W 1.86 | 6 | −4 |
| W 1.88 | 8 | −2 |
| W 1.90 | 0 | −0 |
| W 1.92 | 2 | −8 |
| W 1.94 | 4 | −6 |
| W 1.96 | 6 | −4 |
| W 1.98 | 8 | −2 |
| Positions→ | B | B' |
| W 2.00 | 0 | −0 |
| W 2.02 | 2 | −8 |
| W 2.04 | 4 | −6 |
| W 2.06 | 6 | −4 |
| W 2.08 | 8 | −2 |
| W 2.10 | 0 | −0 |
| W 2.12 | 2 | −8 |
| W 2.14 | 4 | −6 |
| etc. ↓ | etc. ↓ | etc. ↓ |

TABLE VIII

| | NUMBERS DISPLAYED SCALE G | | | | | | | | | |
|---|---|---|---|---|---|---|---|---|---|---|
| Positions→ | D4 | D3 | D2 | D1 | C | U1 | U2 | U3 | U4 | U5 |
| WINDOW # | | | | | | | | | | |
| W 1.0 | 1.0 | 0.5 | 0.0 | 9.5 | 9.0 | 8.5 | 8.0 | 7.5 | 7.0 | 6.5 |
| W 1.1 | 1.1 | 0.6 | 0.1 | 9.6 | 9.1 | 8.6 | 8.1 | 7.6 | 7.1 | 6.6 |
| W 1.2 | 1.2 | 0.7 | 0.2 | 9.7 | 9.2 | 8.7 | 8.2 | 7.7 | 7.2 | 6.7 |
| W 1.3 | 1.3 | 0.8 | 0.3 | 9.8 | 9.3 | 8.8 | 8.3 | 7.8 | 7.3 | 6.8 |
| W 1.4 | 1.4 | 0.9 | 0.4 | 9.9 | 9.4 | 8.9 | 8.4 | 7.9 | 7.4 | 6.9 |
| W 1.5 | 1.5 | 1.0 | 0.5 | 0.0 | 9.5 | 9.0 | 8.5 | 8.0 | 7.5 | 7.0 |
| W 1.6 | 1.6 | 1.1 | 0.6 | 0.1 | 9.6 | 9.1 | 8.6 | 8.1 | 7.6 | 7.1 |
| W 1.7 | 1.7 | 1.2 | 0.7 | 0.2 | 9.7 | 9.2 | 8.7 | 8.2 | 7.7 | 7.2 |
| W 1.8 | 1.8 | 1.3 | 0.8 | 0.3 | 9.8 | 9.3 | 8.3 | 7.8 | 7.8 | 7.3 |
| W 1.9 | 1.9 | 1.4 | 0.9 | 0.4 | 9.9 | 9.4 | 8.9 | 8.4 | 7.9 | 7.4 |
| W 2.0 | 2.0 | 1.5 | 1.0 | 0.5 | 0.0 | 9.5 | 9.0 | 8.5 | 8.0 | 7.5 |
| W 2.1 | 2.1 | 1.6 | 1.1 | 0.6 | 0.1 | 9.6 | 9.1 | 8.6 | 8.1 | 7.6 |
| W 2.2 | 2.2 | 1.7 | 1.2 | 0.7 | 0.2 | 9.7 | 9.2 | 8.7 | 8.2 | 7.7 |
| W 2.3 | 2.3 | 1.8 | 1.3 | 0.8 | 0.3 | 9.8 | 9.3 | 8.8 | 8.3 | 7.8 |
| W 2.4 | 2.4 | 1.9 | 1.4 | 0.9 | 0.4 | 9.9 | 9.4 | 8.9 | 8.4 | 7.9 |
| W 2.5 | 2.5 | 2.0 | 1.5 | 1.0 | 0.5 | 0.0 | 9.5 | 9.0 | 8.5 | 8.0 |
| W 2.6 | 2.6 | 2.1 | 1.6 | 1.1 | 0.6 | 0.1 | 9.6 | 9.1 | 8.6 | 8.1 |
| W 2.7 | 2.7 | 2.2 | 1.7 | 1.2 | 0.7 | 0.2 | 9.7 | 9.2 | 8.7 | 8.2 |
| W 2.8 | 2.8 | 2.3 | 1.8 | 1.3 | 0.8 | 0.3 | 9.8 | 9.3 | 8.8 | 8.3 |
| W 2.9 | 2.9 | 2.4 | 1.9 | 1.4 | 0.9 | 0.4 | 9.9 | 9.4 | 8.9 | 8.4 |

TABLE VIII-continued

| | NUMBERS DISPLAYED SCALE G | | | | | | | | | |
|---|---|---|---|---|---|---|---|---|---|---|
| Positions→ | D4 | D3 | D2 | D1 | C | U1 | U2 | U3 | U4 | U5 |
| W 3.0 | 3.0 | 2.5 | 2.0 | 1.5 | 1.0 | 0.5 | 0.0 | 9.5 | 9.0 | 8.5 |

TABLE IX

| | NUMBERS DISPLAYED SCALE H | | | | | | | | | |
|---|---|---|---|---|---|---|---|---|---|---|
| Positions→ | D4 | D3 | D2 | D1 | C | U1 | U2 | U3 | U4 | U5 |
| WINDOW # | | | | | | | | | | |
| W 1.0 | 6.0 | 5.5 | 5.0 | 4.5 | 4.0 | 3.5 | 3.0 | 2.5 | 2.0 | 1.5 |
| W 1.1 | 6.1 | 5.6 | 5.1 | 4.6 | 4.1 | 3.6 | 3.1 | 2.6 | 2.1 | 1.6 |
| W 1.2 | 6.2 | 5.7 | 5.2 | 4.7 | 4.2 | 3.7 | 3.2 | 2.7 | 2.2 | 1.7 |
| W 1.3 | 6.3 | 5.8 | 5.3 | 4.8 | 4.3 | 3.8 | 3.3 | 2.8 | 2.3 | 1.8 |
| W 1.4 | 6.4 | 5.9 | 5.4 | 4.9 | 4.4 | 3.9 | 3.4 | 2.9 | 2.4 | 1.9 |
| W 1.5 | 6.5 | 6.0 | 5.5 | 5.0 | 4.5 | 3.5 | 3.0 | 3.5 | 2.5 | 2.0 |
| W 1.6 | 6.6 | 6.1 | 5.6 | 5.1 | 4.6 | 4.1 | 3.6 | 3.1 | 2.6 | 2.1 |
| W 1.7 | 6.7 | 6.2 | 5.7 | 5.2 | 4.7 | 4.2 | 3.7 | 3.2 | 2.7 | 2.0 |
| W 1.8 | 6.8 | 6.3 | 5.8 | 5.3 | 4.8 | 4.3 | 3.8 | 3.3 | 2.8 | 2.3 |
| W 1.9 | 6.9 | 6.4 | 5.9 | 5.4 | 4.9 | 4.4 | 3.9 | 3.4 | 2.9 | 2.4 |
| W 2.0 | 7.0 | 6.5 | 6.0 | 5.5 | 5.0 | 4.5 | 4.0 | 3.5 | 3.0 | 2.5 |
| W 2.1 | 7.1 | 6.6 | 6.1 | 5.6 | 5.1 | 4.6 | 4.1 | 3.6 | 3.1 | 2.6 |
| W 2.2 | 7.2 | 6.7 | 6.2 | 5.7 | 5.2 | 4.7 | 4.2 | 3.7 | 3.2 | 2.7 |
| W 2.3 | 7.3 | 6.8 | 6.3 | 5.8 | 5.3 | 4.8 | 4.3 | 3.8 | 3.3 | 2.8 |
| W 2.4 | 7.4 | 6.9 | 6.4 | 5.9 | 5.4 | 4.9 | 4.4 | 3.9 | 3.4 | 2.9 |
| W 2.5 | 7.5 | 7.0 | 6.5 | 6.0 | 5.5 | 5.0 | 4.5 | 4.0 | 3.5 | 3.0 |
| W 2.6 | 7.6 | 7.1 | 6.6 | 6.1 | 5.6 | 5.1 | 4.6 | 4.1 | 3.6 | 3.1 |
| W 2.7 | 7.7 | 7.2 | 6.7 | 6.2 | 5.7 | 5.2 | 4.7 | 4.2 | 3.7 | 3.2 |
| W 2.8 | 7.8 | 7.3 | 6.8 | 6.3 | 5.8 | 5.3 | 4.8 | 4.3 | 3.8 | 3.3 |
| W 2.9 | 7.9 | 7.4 | 6.9 | 6.4 | 5.9 | 5.4 | 4.9 | 4.4 | 3.9 | 3.4 |
| W 3.0 | 8.0 | 7.5 | 7.0 | 6.5 | 6.0 | 5.5 | 5.0 | 4.5 | 4.0 | 3.5 |

TABLE X

| | NUMBERS DISPLAYED SCALE I | | | | | | | | | |
|---|---|---|---|---|---|---|---|---|---|---|
| Positions→ | D4 | D3 | D2 | D1 | C | U1 | U2 | U3 | U4 | U5 |
| WINDOW # | | | | | | | | | | |
| W 1.0 | 3.0 | 2.0 | 1.0 | 0.0 | 9.0 | 8.0 | 7.0 | 6.0 | 5.0 | 4.0 |
| W 1.1 | 3.1 | 2.1 | 1.1 | 0.1 | 9.1 | 8.1 | 7.1 | 6.1 | 5.1 | 4.1 |
| W 1.2 | 3.2 | 2.2 | 1.2 | 0.2 | 9.2 | 8.2 | 7.2 | 6.2 | 5.2 | 4.2 |
| W 1.3 | 3.3 | 2.3 | 1.3 | 0.3 | 9.3 | 8.3 | 7.3 | 6.3 | 5.3 | 4.3 |
| W 1.4 | 3.4 | 2.4 | 1.4 | 0.4 | 9.4 | 8.4 | 7.4 | 6.4 | 5.4 | 4.4 |
| W 1.5 | 3.5 | 2.5 | 1.5 | 0.5 | 9.5 | 8.5 | 7.5 | 6.5 | 5.5 | 4.5 |
| W 1.6 | 3.6 | 2.6 | 1.6 | 0.6 | 9.6 | 8.6 | 7.6 | 6.6 | 5.6 | 4.6 |
| W 1.7 | 3.7 | 2.7 | 1.7 | 0.7 | 9.7 | 8.7 | 7.7 | 6.7 | 5.7 | 4.7 |
| W 1.8 | 3.8 | 2.8 | 1.8 | 0.8 | 9.8 | 8.8 | 7.8 | 6.8 | 5.8 | 4.8 |
| W 1.9 | 3.9 | 2.9 | 1.9 | 0.9 | 9.9 | 8.9 | 7.9 | 6.9 | 5.9 | 4.9 |
| W 2.0 | 4.0 | 3.0 | 2.0 | 1.0 | 0.0 | 9.0 | 8.0 | 7.0 | 6.0 | 5.0 |
| W 2.1 | 4.1 | 3.1 | 2.1 | 1.1 | 0.1 | 9.1 | 8.1 | 7.1 | 6.1 | 5.1 |
| W 2.2 | 4.2 | 3.2 | 2.2 | 1.2 | 0.2 | 9.2 | 8.2 | 7.2 | 6.2 | 5.2 |
| W 2.3 | 4.3 | 3.3 | 2.3 | 1.3 | 0.3 | 9.3 | 8.3 | 7.3 | 6.3 | 5.3 |
| W 2.4 | 4.4 | 3.4 | 2.4 | 1.4 | 0.4 | 9.4 | 8.4 | 7.4 | 6.4 | 5.4 |
| W 2.5 | 4.5 | 3.5 | 2.5 | 1.5 | 0.5 | 9.5 | 8.5 | 7.5 | 6.5 | 5.5 |
| W 2.6 | 4.6 | 3.6 | 2.6 | 1.6 | 0.6 | 9.6 | 8.6 | 7.6 | 6.6 | 5.6 |
| W 2.7 | 4.7 | 3.7 | 2.7 | 1.7 | 0.7 | 9.7 | 8.7 | 7.7 | 6.7 | 5.7 |
| W 2.8 | 4.8 | 3.8 | 2.8 | 1.8 | 0.8 | 9.8 | 8.8 | 7.8 | 6.8 | 5.8 |
| W 2.9 | 4.9 | 3.9 | 2.9 | 1.9 | 0.9 | 9.9 | 8.9 | 7.9 | 6.9 | 59 |
| W 3.0 | 5.0 | 4.0 | 3.0 | 2.0 | 1.0 | 0.0 | 9.0 | 8.0 | 7.0 | 6.0 |

TABLE XI

| | NUMBERS DISPLAYED SCALE J | | | | | | | | | |
|---|---|---|---|---|---|---|---|---|---|---|
| Positions→ | D4 | D3 | D2 | D1 | C | U1 | U2 | U3 | U4 | U5 |
| WINDOW # | | | | | | | | | | |
| W 1.0 | 6.5 | 8.0 | 2.0 | 0.5 | −1.0 | −2.5 | −4.0 | −5.5 | 1.5 | 0.0 |
| W 1.1 | 6.6 | 8.1 | 2.1 | 0.6 | −0.9 | −2.4 | −3.9 | −5.4 | 1.6 | 0.1 |
| W 1.2 | 6.7 | 8.2 | 2.2 | 0.7 | −0.8 | −2.3 | −3.8 | −5.3 | 1.7 | 0.2 |
| W 1.3 | 6.8 | 8.3 | 2.3 | 0.8 | −0.7 | −2.2 | −3.7 | −5.2 | 1.8 | 0.3 |
| W 1.4 | 6.9 | 8.4 | 2.4 | 0.9 | −0.6 | −2.1 | −3.6 | −5.1 | 1.9 | 0.4 |
| W 1.5 | 7.0 | 8.5 | 2.5 | 1.0 | −0.5 | −2.0 | −3.5 | −5.0 | 2.0 | 0.5 |
| W 1.6 | 7.1 | 8.6 | 2.6 | 1.1 | −0.4 | −1.9 | −3.4 | −4.9 | 2.1 | 0.6 |

TABLE XI-continued

| Positions→ | NUMBERS DISPLAYED | | | | | | | | | |
|---|---|---|---|---|---|---|---|---|---|---|
| | | | | | SCALE J | | | | | |
| | D4 | D3 | D2 | D1 | C | U1 | U2 | U3 | U4 | U5 |
| W 1.7 | 7.2 | 8.7 | 2.7 | 1.2 | −0.3 | −1.8 | −3.3 | −4.8 | 2.2 | 0.7 |
| W 1.8 | 7.3 | 8.8 | 2.8 | 1.3 | −0.2 | −1.7 | −3.2 | −4.7 | 2.3 | 0.8 |
| W 1.9 | 7.4 | 8.9 | 2.9 | 1.4 | −0.1 | −1.6 | −3.1 | −4.6 | 2.4 | 0.9 |
| W 2.0 | 7.5 | 9.0 | 3.0 | 1.5 | 0.0 | −1.5 | −3.0 | −4.5 | 2.5 | 1.0 |
| W 2.1 | 7.6 | 9.1 | 3.1 | 1.6 | 0.1 | −1.4 | −2.9 | −4.4 | 2.6 | 1.1 |
| W 2.2 | 7.7 | 9.2 | 3.2 | 1.7 | 0.2 | −1.3 | −2.8 | −4.3 | 2.7 | 1.2 |
| W 2.3 | 7.8 | 9.3 | 3.3 | 1.8 | 0.3 | −1.2 | −2.7 | −4.2 | 2.8 | 1.3 |
| W 2.4 | 7.9 | 9.4 | 3.4 | 1.9 | 0.4 | −1.1 | −2.6 | −4.1 | 2.9 | 1.4 |
| W 2.5 | 8.0 | 9.5 | 3.5 | 2.0 | 0.5 | −1.0 | −2.5 | −4.0 | 3.0 | 1.5 |
| W 2.6 | 8.1 | 9.6 | 3.6 | 2.1 | 0.6 | −0.9 | −2.4 | −3.9 | 3.1 | 1.6 |
| W 2.7 | 8.2 | 9.7 | 3.7 | 2.2 | 0.7 | −0.8 | −2.3 | −3.8 | 3.2 | 1.7 |
| W 2.8 | 8.3 | 9.8 | 3.8 | 2.3 | 0.8 | −0.7 | −2.2 | −3.7 | 3.3 | 1.8 |
| W 2.9 | 8.4 | 9.9 | 3.9 | 2.4 | 0.9 | −0.6 | −2.1 | −3.6 | 3.4 | 1.9 |
| W 3.0 | 8.5 | 0.0 | 4.0 | 2.5 | 1.0 | −0.5 | −2.0 | −3.5 | 3.6 | 2.0 |

When using scale J with the sliding scales 320 and 322 shown in FIG. 14F, the following operations can be achieved. Position C of scale J in conjunction with scales A' from member 320 and B from member 322 provide a cut-and-fill rod with a zero center with red numerals ascending upwards for measuring fill and black numerals ascending downwards for measuring cut. Positions U1, U2 and U3 of the scale J in conjunction with the scales A' and B' from the sliding members 320 and 322, respectively, will provide red numerals ascending upwards for continuity in measuring fill in extension increments of 1.5 meters. Direct measurements of fills from 0 to 5.5 meters (18 feet) is therefore possible with three extension units. Positions D1 and D2 of the scale J in conjunction with the scales A and B will provide black numerals ascending downwards for continuity in the direct measurement of cut from 0 to 4 meters (13 feet) in extension increments of 1.5 meters.

A direct reading elevation rod can be achieved by using the scales A and B of the members 320 and 322. Positions D3 and D4 of the scale J provide for a zero bottom and continuity of measurement for a single extension of 1.5 meters. Positions U4 and U5 provide for a zero top and continuity of measurement with a single extension unit of 1.5 meters. The reverse side (scale I) is a continuously calibratable scale as described above for use in direct reading elevation rods.

A conventional depth reading rod could be obtained with scales A' and B' in conjunction with positions C, U1, U2 and U3 of scale J for an effective rod length of 5.5 meters.

For an architectural metric scale, the arrangement would be similar to that described above, with a 100 meter center scale with 5 up and 4 down positions for continuity with 1.5 meter extension units ad a continuous reading capability for elevations from 52–148 meters.

For a multiple-figure read-out, the arrangement would again be similar to that described above. Instead of a two-piece unit scale, a three-piece unit scale would provide for the continuous display of any desired elevation while maintaining calibration. Each piece would move one place, one after the other and in the same direction as the rod is moved through the zero position represented by the particular unit slide effected. Depending on whether the elevations were increasing or decreasing, the bottom section would move downward first followed by the center and top sections, or the top section would move upward first followed by the center and then the bottom section.

What is claimed is:

1. A grade measurement device of the type comprising a grade rod having a calibrated section of predetermined length having a sequence of numbers thereon for indicating elevation, a base and extension means for changing the distance between said calibrated section and said base by a predetermined distance, said calibrated section comprising;
   a fixed member having M display windows therein of a predetermined intervals;
   a slidable member having printed thereon M sets of numerals each corresponding to a respective one of said M display windows and each of said M sets of numerals comprising N numerals adjacent to one another on said slidable member and any one of which may be displayed in the respective display window at any one time, the numerals simultaneously displayed in all of said windows comprising said sequence of numbers, said slidable member being capable of at least first and second positions relative to said fixed member, a first number in each set being displayed in each display window in said first position of said slidable member and a second number in each set being displayed in each window in said second position of said slidable member, said first and second numbers in each said differing by an amount corresponding to said predetermined distance.

2. A grade measurement device as defined in claim 1, wherein said first and second numbers in each set are adjacent one another.

3. A grade measurement device comprising;
   a first grade rod having a base and a calibrated section of predetermined length having a sequence of numbers thereon for indicating an elevation of said base, said calibrated section comprising; a fixed member having M display windows thereon at predetermined intervals; and a slidable member having printed thereon M sets of numerals each corresponding to a respective one of said M display windows and each of said M sets of numerals comprising N numerals adjacent one another on said slidable member and any one of which may be displayed in the respective display window at any one time, the numerals simultaneously displayed in all of said windows comprising said sequence of numbers;
   a second rod having a base; and
   a liquid level device having first and second tube portions in fluid communication with one another, means for securing said first tube portion to said grade rod and said second tube portion to said second rod, means for adjusting the position of said first tube portion on said grade rod to a position corresponding to a desired elevation whereby the level of fluid in said second tube portion can indicate when the base of said second rod is at said desired elevation.

4. A grade measurement device as defined in claim 3, further comprising electric switch means switchable in accordance with the fluid level in said second tube portion for controlling the operation of an elevation controlling device, e.g. a power hammer.

5. A grade measurement device of the type comprising a grade rod having a calibrated section of predetermined length, said calibrated section including a sequence of numbers for indicating elevation, said calibrated section comprising;

a fixed member having a first set of M display windows therein at predetermined intervals and having a second set of display windows therein;

a first slidable member having printed thereon M sets of numerals each corresponding to a respective one of said first set of display windows and each of said M sets of numerals comprising N numerals adjacent to one another on said slidable member and any one of which may be displayed in the respective one of said first set of display windows at any one time, the numerals simultaneously displayed in all of said first set of display windows comprising said sequence of numbers;

a further sliding means having printed thereon at least first and second numbers to be displayed in each window of said second set of windows, said further sliding means having printed thereon at least first and second numbers to be displayed in each window of said second set of windows, said first set of numbers being displayed in said second set of windows in a first position of said further sliding means and said second set of numbers being displayed in said second set of windows in a second position of said further sliding means.

6. A grade measurement device as defined in claim 5, wherein said further sliding means comprises first and second further sliding members independently slidable with respect to one another and with respect to said fixed member, said first further sliding member having a first set of additional numbers increasing toward the top of said rod and a second set of additional numbers decreasing toward the top of said rod, said second further sliding member having a third set of additional numbers increasing toward the bottom of said rod and a fourth set of additional numbers decreasing toward the bottom of said rod.

7. A grade measurement device as defined in claim 6, wherein said first and second sets of additional numbers are interleaved on said first further sliding member and said third and fourth sets of additional numbers are interleaved on said second further sliding member.

8. A grade measurement device as defined in claim 7, wherein said first further sliding member provides numbers to be displayed in said second set of display windows over a first length region of said fixed member and said second further sliding member provides numbers to be displayed in said second set of display windows over a second length region of said grade rod.

9. A grade measurement device as defined in claim 5, wherein said first slidable member comprises first and second independently slidable portions in substantial vertical alignment with one another.

10. A grade measurement device of the type comprising a grade rod having a base, a target portion to be positioned in an optical path and a calibrated section of predetermined length and including a sequence of numbers thereon for indicating, when said target portion is positioned in said optical path, the relative elevation between said base and a reference elevation, said rod including extension means for extending by a predetermined amount the distance between said target portion and said base, and said calibrated section comprising a fixed member having M display windows therein at predetermined intervals and a slidable member having printed thereon M sets of numerals each corresponding to a respective one of said M display windows and each of said M sets of numerals comprising N numerals adjacent to one another on said slidable member and any one of which may be displayed on the respective display window at any one time, the numerals simultaneously displayed in all of said windows comprising said sequence of numbers, and at least two adjacent numerals in each set of N numerals differing by a value corresponding to said predetermined amount, whereby, when said rod has been calibrated and said extension means is subsequently employed to extend by said predetermined amount the distance between said target portion and said base, said rod can be recalibrated by sliding said slidable member relative to said fixed member by an amount corresponding to the distance between adjacent numerals in each set.

11. A grade measurement device as defined in claim 10, wherein said target portion is said calibrated section and said extension means is between said base and calibrated section.

12. A grade measurement device as defined in claim 10, wherein said target portion is separate from said calibrated section and is separated from said calibrated section by said extension means.

13. A grade measurement device as defined in claim 10, wherein said slidable member is capable of N positions relative to said fixed member and a different sequence of numbers is displayed in each of said N positions.

14. A grade measurement device as defined in claim 13, wherein said N numbers in each set are adjacent one another.

15. A grade measurement device as defined in claim 10, further comprising an adjustment leg fixed to said base and slidably secured to said member, and means for clamping said adjustment leg and fixed member at various relative positions to thereby adjust the distance between said fixed member and said base by amounts less than said predetermined amount.

16. A grade measurement device as defined in claim 15, said device further comprising a bubble-type level indicating means comprising fluid containment means, a quantity of fluid within said fluid containment means and including a bubble therein, said fluid containment means being secured to said adjustment leg and having an upper surface which is at least partially transparent, and indicating means on said upper surface for indicating when said bubble is in a position representing correct vertical positioning of said grade rod.

17. A grade measurement device as defined in claim 10, wherein said slidable member comprises first and second independently slidable portions in substantial vertical alignment with one another.

18. A grade measurement device of the type comprising a grade rod having a calibrated section of predetermined length, said calibrated section including a sequence of numbers for indicating elevation, said calibrated section comprising:

a fixed member having M display windows therein at predetermined intervals; and a slidable member having printed thereon M sets of numerals each corresponding to a respective one of said M display windows and each of said M sets of numerals comprising N numerals adjacent one another on said slidable member and any one of which may be displayed in the respective display window at any one time, the numerals simultaneously displayed in all of said windows comprising said sequence of numbers, said sequence of numbers displayed in said windows including a zero position with said displayed numbers increasing on either side of said zero position.

19. A grade measurement device of the type comprising a grade rod having a calibrated section of predetermined length, said calibrated section including a sequence of numbers for indicating elevation, said calibrated section comprising:
- a fixed member having M display windows therein at predetermined intervals; and
- a slidable member having printed thereon M sets of numerals each corresponding to a respective one of said M display windows and each of said M sets of numerals comprising N numerals adjacent one another on said slidable member and any one of which may be displayed in the respective display window at any one time, the numerals simultaneously displayed in all of said windows comprising said sequence of numbers, adjacent numerals in all sets of numbers differing by a common value and the last number in each set differing from the first number in an adjacent set by an amount other than the common value.

20. A grade measurement device of the type comprising a grade rod having a calibrated section of predetermined length, said calibrated section including a sequence of numbers for indicating elevation, said calibrated section comprising:
- a fixed member having M display windows therein at predetermined intervals; and
- a slidable member having printed thereon M sets of numerals each corresponding to a respective one of said M display windows and each of said M sets of numerals comprising N numerals adjacent one another on said slidable member, adjacent numerals in each set differing by a value corresponding to a distance greater than the predetermined interval between successive display windows, said display windows displaying one numeral from a respective set at any one time, the numeral simultaneously displayed in all of said windows comprising said sequence of numbers.

21. A grade measurement device of the type comprising a grade rod having a calibrated section of predetermined length, said calibrated section including a sequence of numbers for indicating elevation, said calibrated section comprising:
- a fixed member having M display windows therein at predetermined intervals, said fixed member also having gradation markings for indicating distances less than the distances between successive of display windows, said gradation markings comprising three different shaped symbols arranged in a repetitive sequence along the length direction of said rod with no two adjacent symbols being the same, each of said symbols having a center line perpendicular to said length direction of said rod and each being symmetrical with respect to its center line; and
- a slidable member having printed thereon M sets of numerals each corresponding to a respective one of said M display windows and each of said M sets of numerals comprising N numerals adjacent one another on said slidable member and any one of which may be displayed in the respective display window at any one time, the numerals simultaneously displayed in all of said windows comprising said sequence of numbers.

22. A grade measurement device of the type comprising a grade rod having a calibrated section of predetermined length, said calibrated section including a sequence numbers indicating elevation, said calibrated section comprising;
- a fixed member having M display positions at predetermined intervals;
- multi-segment display means at each position for displaying different numerical values in accordance with energization of different segment combinations; and
- display control means for energizing selected combinations of segments of each multi-segment display at different relative positions of said calibrated section and base.

23. A grade measurement device as defined in claim 22, wherein said display control means comprises a plurality of contact sets equal in number to the number of said display positions and each set including a switch for each segment of its respective multi-segment display.

24. A grade measurement device as defined in claim 33, wherein each multi-segment display means includes N segments, said display control means comprising a stationary contact member maintaining a fixed position with respect to said fixed member and including an array of M rows of switch contacts each including N switches; a slidable contact member having M rows of contacts for contacting different combinations of contacts in a respective row of said stationary member contact array; and means for connecting electrical power to selected segments in each multi-segment display in accordance with the relative positions of said stationary and slidable contact members.

25. A grade measurement device of the type comprising a grade rod having a base and a calibrated section, said device further including a second rod, a liquid level device having first and second tube portions in fluid communication with one another, and attachment means for attaching said first tube portion to said grade rod and said second tube portion to said second rod at distances from the bases of their respective rods such that the level of fluid in said second tube portion will indicate when the base of said second rod is at a desired level.

26. A grade measurement device of the type comprising a grade rod having a calibrated section of predetermined length, said calibrated section including a sequence of numbers for indicating elevation and gradation markings for indicating increments in elevation less than the increments represented by the interval between said numbers, said gradation markings comprising:
- at least four symbols arranged in a repetitive sequence along the length direction of said rod with no two adjacent symbols being the same, each of said symbols having a center line perpendicular to said length direction of said rod, first and third symbols each being symmetrical with respect to its center line and having three positions along said length direction of said rod indicating discreet elevation increments, second and fourth symbols in said repetitive sequence each having two positions along said length direction of said rod indicating elevation increments.

27. A grade measurement device as defined in claim 26, wherein said second and fourth symbols are each symmetrical with respect to their respective center lines.

28. A grade measurement device as defined in claim 26, wherein said second and fourth symbols are each asymmetrical about their respective center lines.

29. A grade measurement device as defined in claim 28, wherein each of said positions of each symbol is either an extension point or a recess, with extension points and recesses alternating throughout said repetitive sequence.

* * * * *